(12) United States Patent  
Bessler et al.

(10) Patent No.: US 8,060,396 B1  
(45) Date of Patent: Nov. 15, 2011

(54) BUSINESS ACTIVITY MONITORING TOOL

(75) Inventors: James E. Bessler, Overland Park, KS (US); James T. Deel, Sprint Hill, KS (US); Shawn M. Hudson, Olathe, KS (US); Madan Mohan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1890 days.

(21) Appl. No.: 10/806,909

(22) Filed: Mar. 23, 2004

(51) Int. Cl.  
*G06Q 10/00* (2006.01)

(52) U.S. Cl. ............... 705/7.23; 705/7.22; 705/7.25; 705/7.27

(58) Field of Classification Search ............. 705/7.23, 705/7.25, 7.27, 7.22  
See application file for complete search history.

(56) References Cited

U.S. PATENT DOCUMENTS

| | | | |
|---|---|---|---|
| 6,026,365 A | 2/2000 | Hayashi | |
| 6,092,049 A | 7/2000 | Chislenko et al. | |
| 6,321,133 B1 | 11/2001 | Smirnov et al. | |
| 6,343,275 B1 | 1/2002 | Wong | |
| 6,415,194 B1 | 7/2002 | Gleditsch et al. | |
| 6,578,006 B1 | 6/2003 | Saito et al. | |
| 6,684,213 B1 | 1/2004 | Schell et al. | |
| 6,850,530 B1 * | 2/2005 | Waclawsky et al. | 370/401 |
| 6,957,190 B1 | 10/2005 | Sakayori et al. | |
| 6,980,963 B1 | 12/2005 | Hanzek | |
| 7,171,373 B2 | 1/2007 | Lahey et al. | |
| 7,624,033 B1 | 11/2009 | Jean et al. | |
| 7,979,297 B1 | 7/2011 | Shivananda et al. | |
| 2002/0059090 A1 | 5/2002 | Yanagimachi | |
| 2002/0077842 A1 | 6/2002 | Charisius et al. | |
| 2003/0033191 A1 * | 2/2003 | Davies et al. | 705/10 |
| 2003/0115087 A1 | 6/2003 | Ueno | |
| 2003/0171907 A1 * | 9/2003 | Gal-On et al. | 703/14 |
| 2003/0225595 A1 * | 12/2003 | Helmus et al. | 705/2 |
| 2005/0257136 A1 | 11/2005 | Charisius et al. | |

OTHER PUBLICATIONS

Vitria Inc.'s 2001 product brief for: BusinessWare Communicator, dated: Jul. 21, 2004.*  
Fulton, Sams, "Teach Yourself Microsoft Excel in 10 Minutes," Apr. 30, 1990, Lesson 27, Adding Hyperlinks to a Worksheet.  
Office Action dated Apr. 19, 2007 (15 pages), U.S. Appl. No. 10/272,423, filed Oct. 16, 2002.  
Final Office Action dated Sep. 14, 2007 (17 pages), U.S. Appl. No. 10/272,423, filed Oct. 16, 2002.  
Advisory Action dated Nov. 27, 2007 (3 pages), U.S. Appl. No. 10/272,423, filed Oct. 16, 2002.  
Office Action dated Feb. 21, 2008 (19 pages), U.S. Appl. No. 10/272,423, filed Oct. 16, 2002.  
Final Office Action dated Aug. 7, 2008 (22 pages), U.S. Appl. No. 10/272,423, filed Oct. 16, 2002.

(Continued)

*Primary Examiner* — Beth V Boswell  
*Assistant Examiner* — Adrian McPhillip

(57) ABSTRACT

A system for monitoring orders processed by order processing applications implemented on computer systems is provided. The order processing monitor comprises an application to process a portion of an order and to write application data to a log file, the application data related to the processing of the order by the application, a log adapter operable to communicate with the log file to obtain at least a portion of the application data, a log agent operable to monitor a resource data related to a computer system used by the application to process at least some of the order, and a monitor component in communication with the log adapter to obtain the portion of the application data and operable to obtain at least a portion of the resource data, the monitor component using the application data and resource data to determine order status information.

23 Claims, 24 Drawing Sheets

OTHER PUBLICATIONS

Advisory Action dated Oct. 22, 2008 (3 pages), U.S. Appl. No. 10/272,423, filed Oct. 16, 2002.
Vitria Business Cockpit Brochure, 2001.
Vitria Communicator Data Sheet, 2001.
Vitria Communicator Product Brief, 2001.
Vitria Architecture Overview, May 22, 2002.
Sunitha Shivananda, et al., *Order Tracking and Reporting Tool*, filed—Oct. 16, 2002, U.S. Appl. No. 10/272,423, Specification (23 pgs.) and Drawings (21 sheets, Figs. 1-18).

Examiners Answer dated Apr. 27, 2009, (27 pages) U.S. Appl. No. 10/272,423, filed Oct. 16, 2002.
Notice of Allowance dated Mar. 7, 2011, U.S. Appl. No. 10/272,423, filed Oct. 16, 2002.
Decision on Appeal dated Dec. 16, 2010, U.S. Appl. No. 10/272,423, filed Oct. 16, 2002.

* cited by examiner

Workflow Alarms 206

This data is provided for demonstration purposes only.

| Order ID | Application 204 | Execution Time (HH:MM:SS) | Severity Level 208 |
|---|---|---|---|
| 5466 | Running Control Broker (CJ) | 514 days 20:08:45 | ● |
| 000005278 | Running Information Broker (FMS) | 146 days 20:12:15 | ● |
| 5278 | Running Control Broker (CJ) | 146 days 20:09:03 | ● |
| 1212 | Running Control Broker (CJ) | 146 days 20:09:01 | ● |
| 3350 | Running Information Broker (FMS) | 146 days 20:08:07 | ● |
| 3978 | Running Information Broker (FMS) | 146 days 20:07:40 | ● |
| 5406 | Running Control Broker (CJ) | 146 days 20:07:02 | ● |
| 5512 | Running Control Broker (CJ) | 146 days 20:07:00 | ● |
| 3468 | Running Control Broker (CJ) | 146 days 20:06:32 | ● |
| 000005468 | Running Information Broker (FMS) | 146 days 20:04:45 | ● |
| 000003978 | Running Information Broker (FMS) | 146 days 20:04:41 | ● |
| 000005512 | Running Information Broker (FMS) | 146 days 20:04:40 | ● |
| 5773 | Running Control Broker (CJ) | 141 days 20:47:01 | ● |
| 5772 | Running Control Broker (CJ) | 141 days 19:59:41 | ● |
| 5770 | Running Control Broker (CJ) | 141 days 19:59:39 | ● |
| 5555 | Running Control Broker (CJ) | 141 days 03:11:41 | ● |
| 1231 | Running Control Broker (CJ) | 141 days 02:07:40 | ● |
| 5777 | Running Control Broker (CJ) | 140 days 22:15:27 | ● |
| 5781 | Running Control Broker (CJ) | 140 days 21:19:24 | ● |
| 9999 | Running Control Broker (CJ) | 140 days 01:10:10 | ● |

Figure 5

Order Reporting

Click the report results link to see the order detail or click Download Excel File link to download the results.

| VIEW: | ServiceOrder |
| --- | --- |
| PRODUCT TYPE: | * |
| ACTION CODE: | * |
| ORDER SCENARIO: | * |
| DURATION (days): | * |

MILESTONE NAME:
FMSAck-Accepted
FMSAck-Rejected
FMSComplete-Processed
FMSReceived
OM-OrderCancelled

[Search]

Download Excel File

Report for SIMS2-OrderComplete-Processed — 766

| Product Type | Order Type | Action Code | Service Order ID | Source System Order ID | Milestone Name | Order Entry Time | Duration |
| --- | --- | --- | --- | --- | --- | --- | --- |
| IP | INIP | INSTALL | 002114n07 | SOID22 | SIMS2-OrderComplete-Processed | 2003-10-03 16:45:00 | 9 day(s) 16.40:24 |
| IP | INIP | INSTALL | 1322 | 000004094 | SIMS2-OrderComplete-Processed | 2003-06-24 15:53:11 | 54 day(s) 16.52:15 |
| IP | DNIP | INSTALL_COORD_DOWNGRADE | 1338 | 000004131 | SIMS2-OrderComplete-Processed | 2003-06-25 16:22:47 | 69 day(s) 17:49:44 |
| IP | INIP | INSTALL | 932 | 000002933 | SIMS2-OrderComplete-Processed | 2003-05-29 11:12:29 | 54 day(s) 16:43:56 |
| IP | INIP | INSTALL | 939 | 000002955 | SIMS2-OrderComplete-Processed | 2003-05-30 00:00:52 | 54 day(s) 16.4818 |
| IP | INIP | INSTALL | 9999 | 11 | SIMS2-OrderComplete-Processed | 2003-09-30 10:00:00 | 12 day(s) 22.49:52 |
| IP | DCIP | DISCONNECT | disconnect1 | SSOID5 | | 2003-10-09 | 3 day(s) |

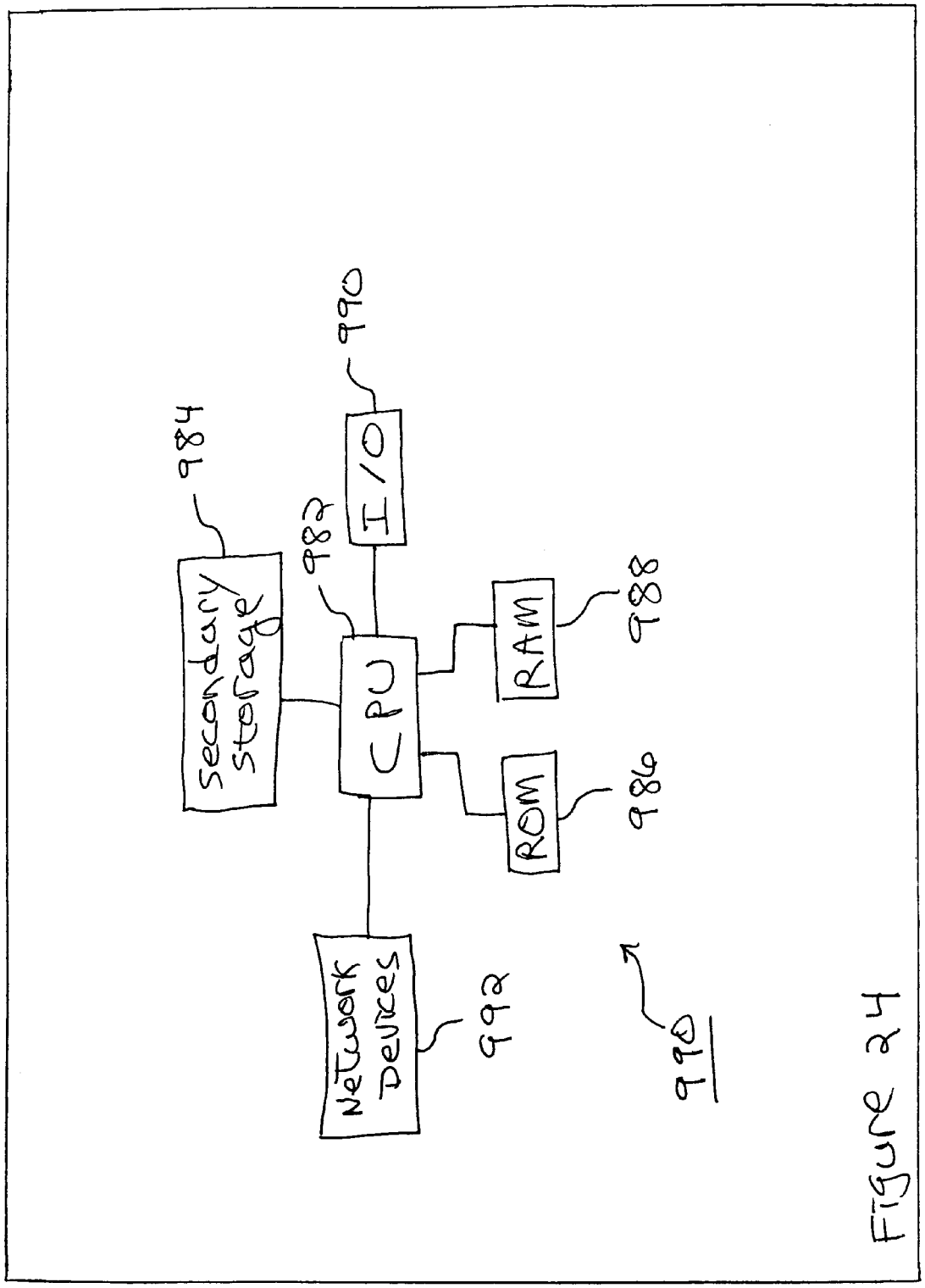

BUSINESS ACTIVITY MONITORING TOOL

CROSS-REFERENCE TO RELATED APPLICATIONS

This application is related to U.S. patent application Ser. No. 10/272,423, filed Oct. 16, 2002, entitled "Order tracking and reporting tool," invented by Sunitha Shivananda, et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software, and more particularly, but not by way of limitation, to a system and method for monitoring an automated order entry system.

BACKGROUND OF THE INVENTION

Some enterprises depend upon a multitude of computer programs or applications which execute on several different computer systems to conduct their business. The applications may be developed using different programming languages and may have been developed at different times. The computer systems may be from different manufacturers and may employ different operating systems. A telecommunications operating company, for example, may depend upon computer applications to enter a customer order for telecommunications service, to provide telecommunications services to the customer, to generate a customer bill for telecommunications services, and to record customer payments. In enterprises which depend heavily upon computer applications and computer systems to conduct their business it is important to monitor those computer applications and computer systems.

SUMMARY OF THE INVENTION

A system for monitoring orders processed by order processing applications implemented on computer systems is provided. The order processing monitor comprises an application to process a portion of an order and to write application data to a log file, the application data related to the processing of the order by the application, a log adapter operable to communicate with the log file to obtain at least a portion of the application data, a log agent operable to monitor a resource data related to a computer system used by the application to process at least some of the order, and a monitor component in communication with the log adapter to obtain the portion of the application data and operable to obtain at least a portion of the resource data, the monitor component using the application data and resource data to determine order status information.

A system for monitoring orders processed by order processing applications implemented on computer systems is also provided. The order processing monitor comprises a workflow tool to manage applications processing orders, a workflow database operable to receive, via the workflow tool, application data related to the applications processing of the orders, an analysis tool to monitor the processing of the orders via the workflow database, and a graphical user interface operable to use application data received via the analysis tool, the graphical user interface illustrating a status of one or more of the orders by graphically providing indicia identifying one or more of the applications processing portions of one or more of the orders.

A method for monitoring order processing by an order processing system including applications operating on computer systems is also provided. The method comprises processing at least a portion of the orders by one or more of the applications, writing, by the applications, application data related to the applications processing of the orders to one or more log files, writing to the one or more log files hardware information related to the computer systems whereon the applications process the orders, and aggregating at least portions of the hardware information and application data to monitor the order processing.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5 depicts a workflow alarms graphical user interface screen for using the business activity monitoring system.

FIG. 23 depicts an order list graphical user interface screen for using the business activity monitoring system.

FIG. 24 illustrates an exemplary general purpose computer system suitable for implementing the several embodiments of the business activity monitoring system.

DETAILED DESCRIPTION OF THE PREFERRED EMBODIMENTS

Figure 1:
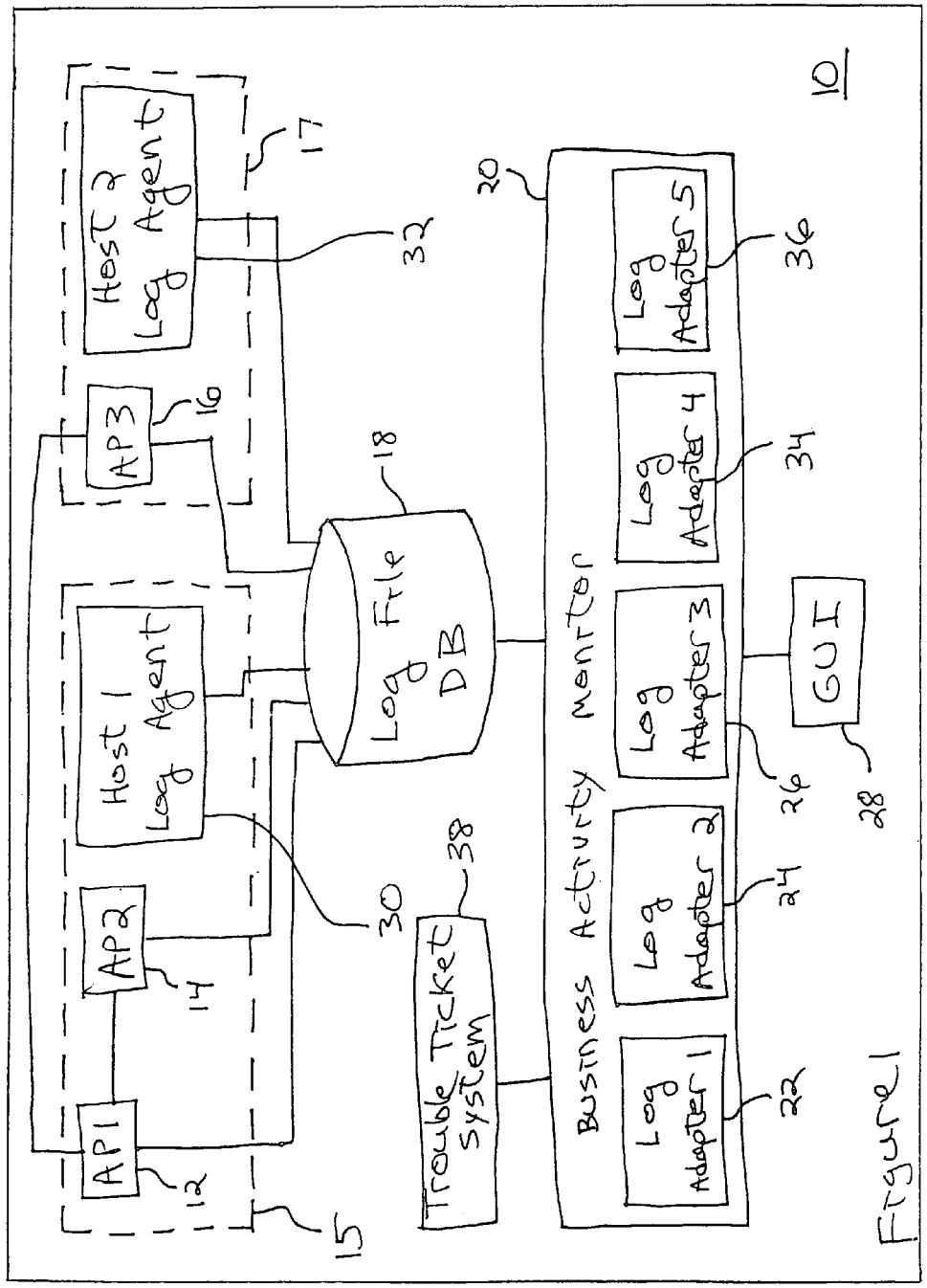
FIG. 1 depicts a business activity monitoring system.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Many customer-oriented enterprises rely on largely automated procedures for receiving, entering, and completing a customer order. With large businesses processing hundreds of thousands of orders per month, it is vital to ensure that orders are processed efficiently in order to preserve customer satisfaction. Tracking and reporting data ensures that orders are not accumulating at any one step without any forward progress through the workflow. Identifying bottlenecks in the business process that block forward progress of other orders is important to recognizing workflow areas that need increased headcount or computing capacity. For example, if it is determined that many orders are being received for new telephone service, but only a small percentage are being queued for implementation, steps can be taken to proactively improve order fulfillment. As it would be time-consuming to monitor the status of each individual order, it is desirable to track and archive data that can be analyzed for trends or bottlenecks.

A key to maintaining customer satisfaction is the ability to query the real-time status of any order and identify its present state within the workflow, so that the status may be reported to the customer on demand. It is also desirable to be able to research all orders for a particular customer, across all processes within the workflow. It is also desirable to record the time it takes for an order to transition from state to state within the workflow. In addition to providing data to analyze for process optimization, historical data could also contribute to more accurate business forecasting by assisting in predicting future peak order periods, for example, so that they may be adequately prepared for. Collecting real-time data as well as historical data may be complicated by the existence of data on multiple systems with differing architectures. Historically, there has been no systematic, efficient way to access the level of order information desired across a multitude of legacy systems.

Enterprise employees at different levels in the organization have a need for different levels of information. A vice-president may need to know that the billing system is operating, that the order system is operating, that the return on investment on a system is on target, and that service failures are below an acceptable limit. An operator or technician responsible for the care and feeding of the billing system, however, needs much finer details about the performance of the billing system. The billing system may be operating, but it may be approaching a processing overload which demands deploying additional servers to share the processing burden.

What is needed, therefore, is a business activity monitoring system and method which provides near real-time access to business performance indicators for a diverse audience. Although several of the embodiments disclose order-based business processes, it will be appreciated that the present system may be implemented based on any business process or event and the implementations relating to order processing are exemplary.

Turning now to FIG. 1, a business activity monitor (BAM) system 10 is depicted. Computer applications 12 and 14 execute on a first general purpose computer system 15. Computer application 16 executes on a second general purpose computer system 17. In some embodiments other distributions of applications to general purpose computer systems may be employed. General purpose computer systems are discussed in more detail hereinafter.

Applications 12, 14, and 16 are in communication with each other and cooperate to provide a business process. In some embodiments this business process may be a telecommunications service provider automated order entry system for providing Internet protocol (IP) service and frame relay service to customers. While three applications 12, 14, and 16 are depicted in FIG. 1, in some embodiments many more computer applications may be involved in providing the business process.

Each of the applications 12, 14, and 16 occasionally generates reports, referred to hereinafter as logs, which they write out to a log file database 18. These logs may contain a time stamp indicating the date and time that the log was generated. The logs typically contain some textual information relating to the processing of the application 12, 14, or 16. The logs from the applications 12, 14, and 16 are written to separate log files in the log file database 18. For example, the logs from application 12 are written to an application 12 log file, the logs from application 14 are written to an application 14 log file, and the logs from application 16 are written to an application 16 log file.

A BAM 20 is in communication with the log file database 18. The BAM 20 includes a first log adapter 22 which reads the application 12 log file, a second log adapter 24 which reads the application 14 log file, and a third log adapter 26 which reads the application 16 log file. In reading the log file, each log adapter 22, 24, or 26 filters through all logs and finds those log file entries which speak to the performance of the application 12, 14, or 16, parses the selected log file entries to extract the needed information, and stores this needed information for processing by the BAM 20. The BAM 20 may invoke each of the log file adapters 22, 24, and 26 on a periodic basis, for example every five minutes or at some other periodic rate. The log adapters 22, 24, 26 in some embodiments may be implemented as Perl scripts. The BAM 20 informs itself about the performance of the applications 12, 14, and 16 through the log adapters 22, 24, and 26. In some embodiments where there may be many more applications, there may be many more log adapters than those shown in FIG. 1.

The BAM 20 is in communication with a graphical user interface (GUI) 28. The GUI 28 provides a means for selecting different presentation views of the business activity information gathered by the BAM 20.

A host 1 log agent 30 executing on the first general purpose computer system 15 periodically looks up the system statistics of the first general purpose computer system 15 and logs them to a log file on the log file database 18. A host 2 log agent 32 executing on the second general purpose computer system 17 periodically looks up the system statistics of the second general purpose computer system 17 and logs them to a log file on the log file database 18. A fourth log adapter 34 reads the host 1 log agent 30 log file and a fifth log adapter 36 reads the host 2 log agent 32 log file. The fourth log adapter 34 and fifth log adapter 36 filter through all logs and finds those system logs which are pertinent, parses these logs to extract the needed information, and stores this information for processing by the BAM 20. The BAM 20 may invoke the fourth log adapter 34 and the fifth log adapter 36 on a periodic basis. In some embodiments the fourth log adapter 34 and the fifth log adapter 36 may be implemented as Perl scripts. These system statistics may include central processor unit (CPU) utilization, random access memory utilization, and other information.

The BAM 20 is also in communication with an enterprise trouble ticket system 38. The BAM 20 may extract current trouble ticket information from the trouble ticket system 38.

Figure 2:
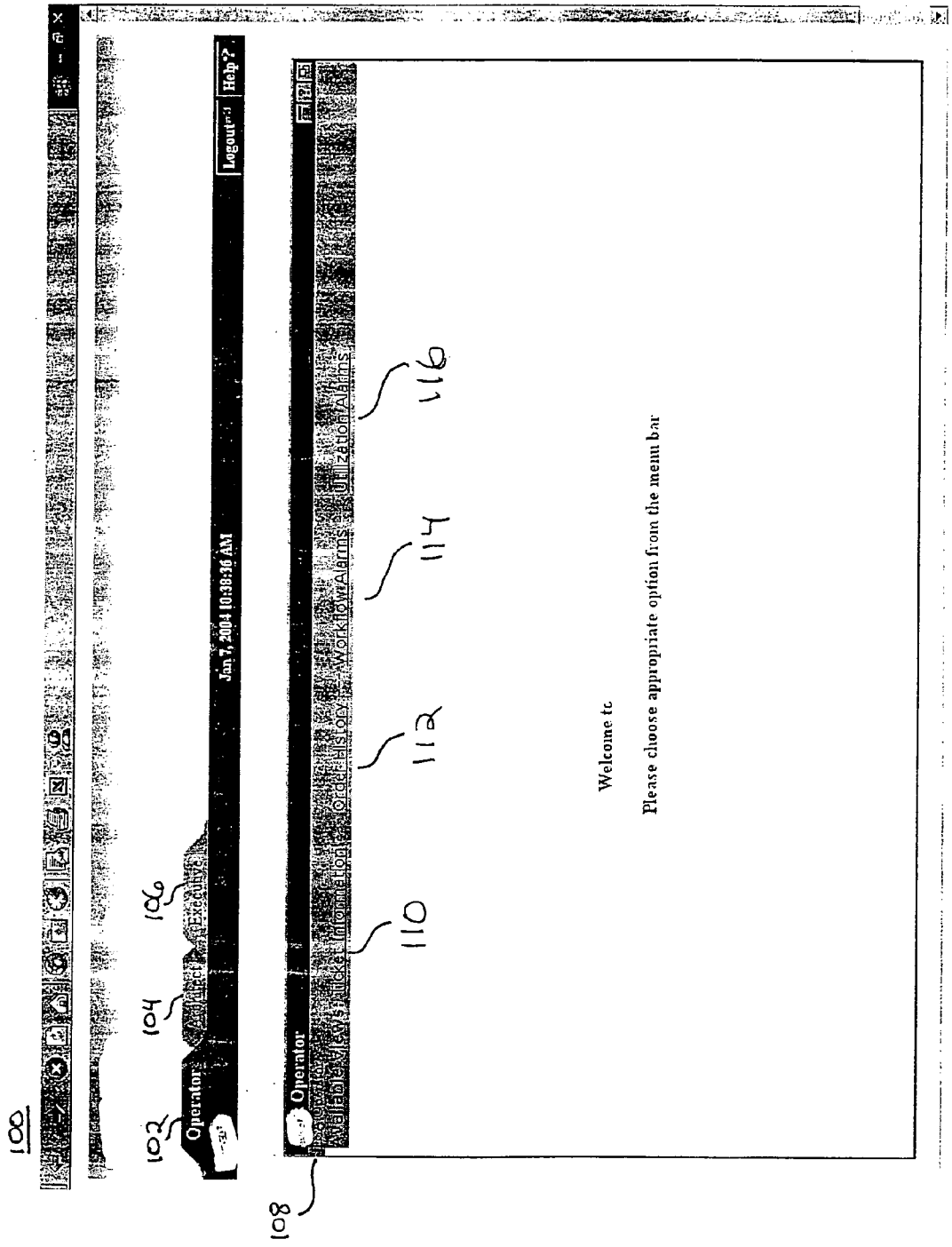
FIG. 2 depicts an operator view top-level graphical user interface screen for using the business activity monitoring system.

Turning now to FIG. 2 a GUI entrance screen 100 for accessing the BAM system 10 is depicted. An operator tab 102, an architect tab 104, and an executive tab 106 located at the top of the GUI entrance screen 100 permit selection of BAM 20 generated information tuned to the interests of an operator, a technology architect, or an executive respectively. Selecting the architect view tab 104 causes an architect view top-level GUI screen 300 to display. Selecting the executive view tab 106 causes an executive view top-level GUI screen 400 to display.

FIG. 2 depicts the operator tab 102 having been selected, and an operator view top-level GUI screen 108 is displayed. The operator view top-level GUI screen 108 provides a Ticket Information view selector 110, an Order History view selector 112, a Workflow Alarms view selector 114, and an Utilization Alarms view selector 116. Selecting the Ticket Information view selector 110 displays information on open trouble tickets which the BAM 20 extracts from the internal ticketing system. Selecting the Order History view selector 112 causes an Order History GUI screen 150 to display. Selecting the Workflow Alarms view selector 114 causes a Workflow Alarms GUI screen 200 to display. Selecting the Utilization Alarms view selector 116 causes a Utilization Alarms GUI screen 250 to display.

Figure 3:
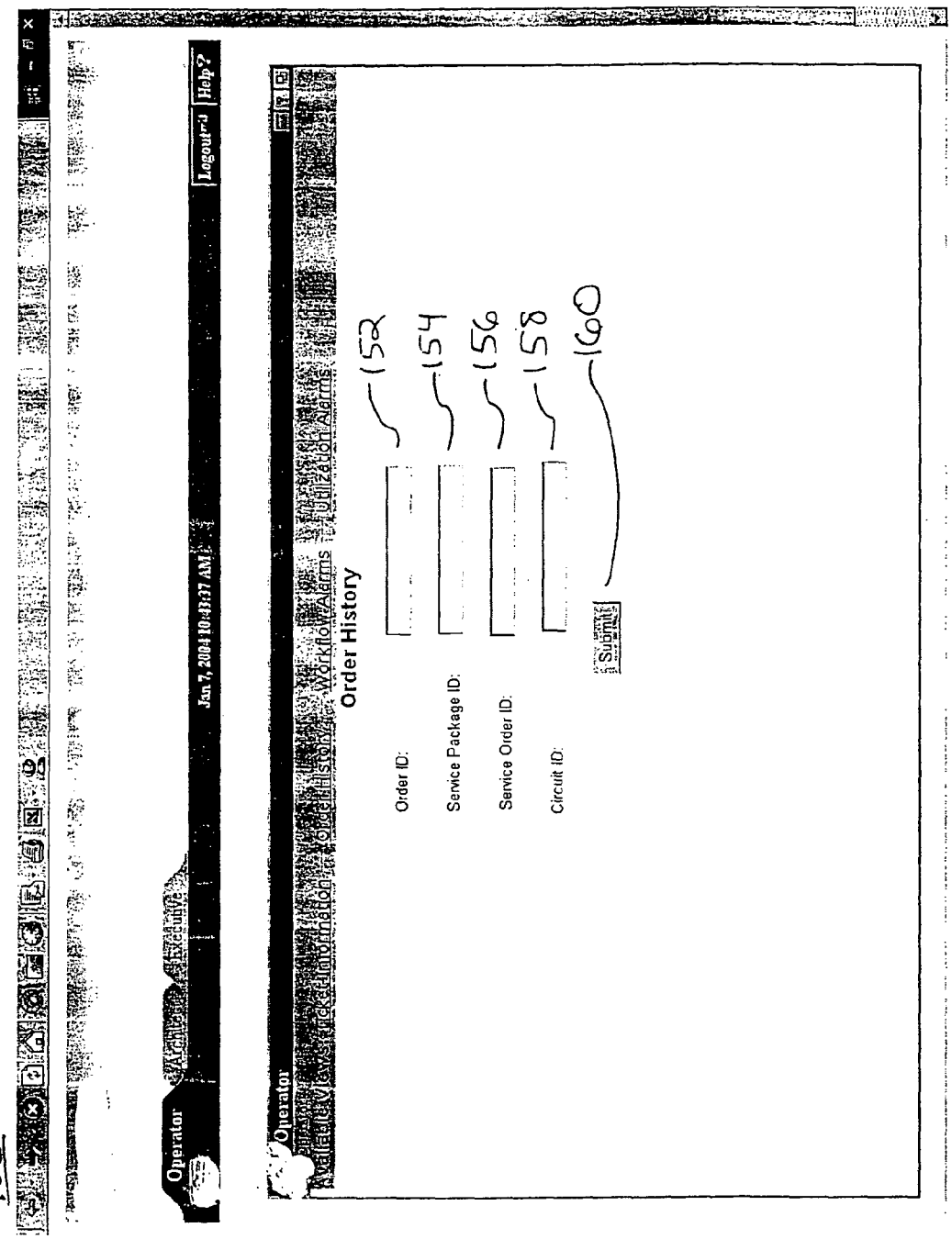
FIG. 3 depicts a first view of an order history graphical user interface screen for using the business activity monitoring system.

Turning now to FIG. 3, a first view of the Order History GUI screen 150 is depicted and includes an order ID box 152, a service package ID box 154, a service order ID box 156, a circuit ID box 158, and a submit button 160. Supplying information to the appropriate box 152, 154, 156, and 158 and then selecting the submit button 160 causes the appropriate order histories to be displayed in a tabular format 162 at the bottom of the Order History GUI screen 150.

Figure 4:
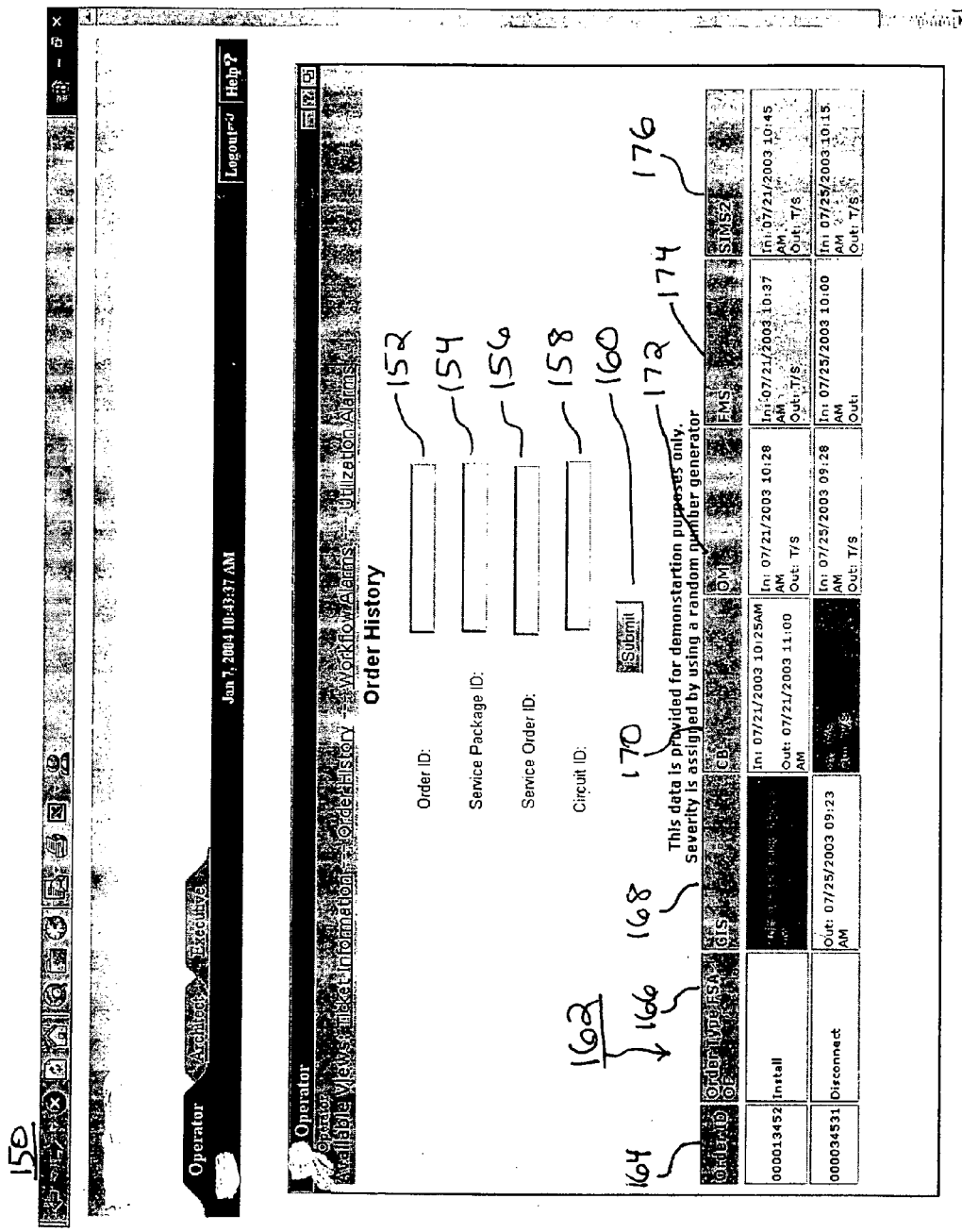
FIG. 4 depicts a second view of the order history graphical user interface screen, populated with order history list data.

Turning now to FIG. 4, a second view of the Order History GUI screen 150 is depicted with order histories displayed in a table 162. This exemplary information might be displayed after activating the submit button 160, as discussed above. The headings of the table 162 include order ID 164, order type 166, and various applications 168, 170, 172, 174, and 176. The information displayed in the columns for each application 168, 170, 172, 174, and 176 include the time and date of the entry of the order into the application and the time and date of the exit of the order from the application. The information boxes in the columns for each application 168, 170, 172, 174, and 176 is color coded in accordance with how long the application took to process the order based on the application's service level agreement. If the processing time is well within the service level agreement, the information box is color coded according to a first color. If the processing time is marginally within the limits of the service level agreement, for example if the processing time exceeds a threshold of 90% of the service level agreement maximum processing time, the information box is color coded according to a second color. In some embodiments the threshold for evaluating processing time to be marginally within tolerance may be applied from the range of 75% to 98% of the service level agreement processing time. In some embodiments the threshold may be readily modified by operators by editing an extensible markup language (XML) configuration file or an otherwise formatted configuration file. If the processing time is in violation of the application's service level agreement, the information box is color coded according to a third color.

Turning now to FIG. 5, the Workflow Alarms GUI screen 200 is depicted and lists all order IDs, under the order ID heading 202, of orders which have entered an alarm condition and indicates, under the application heading 204, the application process during which this alarm condition was entered. The execution time in the application is indicated under the execution time heading 206. The severity level of the alarm is indicated by color coding under the severity level heading 208. If there are too many alarms to display in the screen, a scroll bar permits scrolling through the alarms. Alarms are triggered when application processing time exceeds the thresholds based on the service level agreements of the applications which are discussed above. In some embodiments email and/or paging notifications may be sent based on the alarm data captured by the BAM 20.

Figure 6:
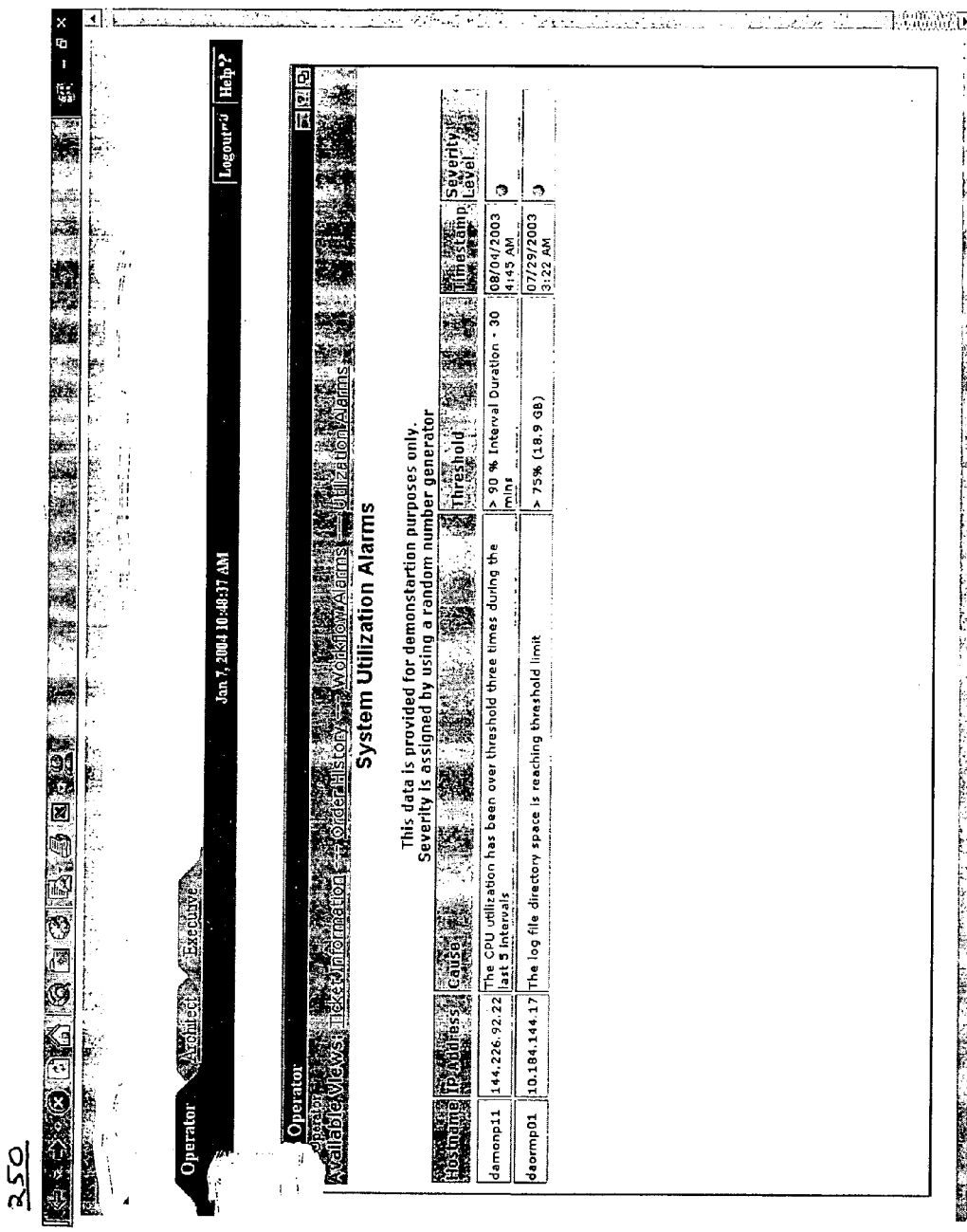
FIG. 6 depicts a system utilization alarms graphical user interface screen for using the business activity monitoring system.

Turning now to FIG. 6, the System Utilization Alarms GUI screen 250 is depicted and lists all system level operational threshold violations and warning conditions. These operational violations and warnings pertain to hardware or operating system performance issues. The alarms identify the hostname of the computer associated with the system alarm, the IP address of the computer, the cause of the system alarm condition, the threshold which is being exceeded, the date and time when the threshold was exceeded, and the severity level of the system alarm. In some embodiments the system utilization alarm threshold may be modified by operators by editing an XML configuration file or an otherwise formatted configuration file. If there are too many alarms to display in the screen, a scroll bar permits scrolling through the system alarms. In some embodiments email and/or paging notifications may be sent based on the system utilization data captured by the BAM 20.

In some embodiments it may be necessary to monitor computer memory page statistics rather than computer memory allocation when deriving an indication of memory capacity headroom. In some Sun computer systems, for example, the operating system may allocate all memory on start-up to cache memory. In this case, the system statistic for memory would indicate a 100 percent memory utilization, which would normally support the conclusion that spare memory was exhausted and the computer system could allocate no further memory to requesting applications 12, 14, or 16. This conclusion would be mistaken, however. The system statistic for memory pages does give a useable indication of memory available for processes.

Figure 7:
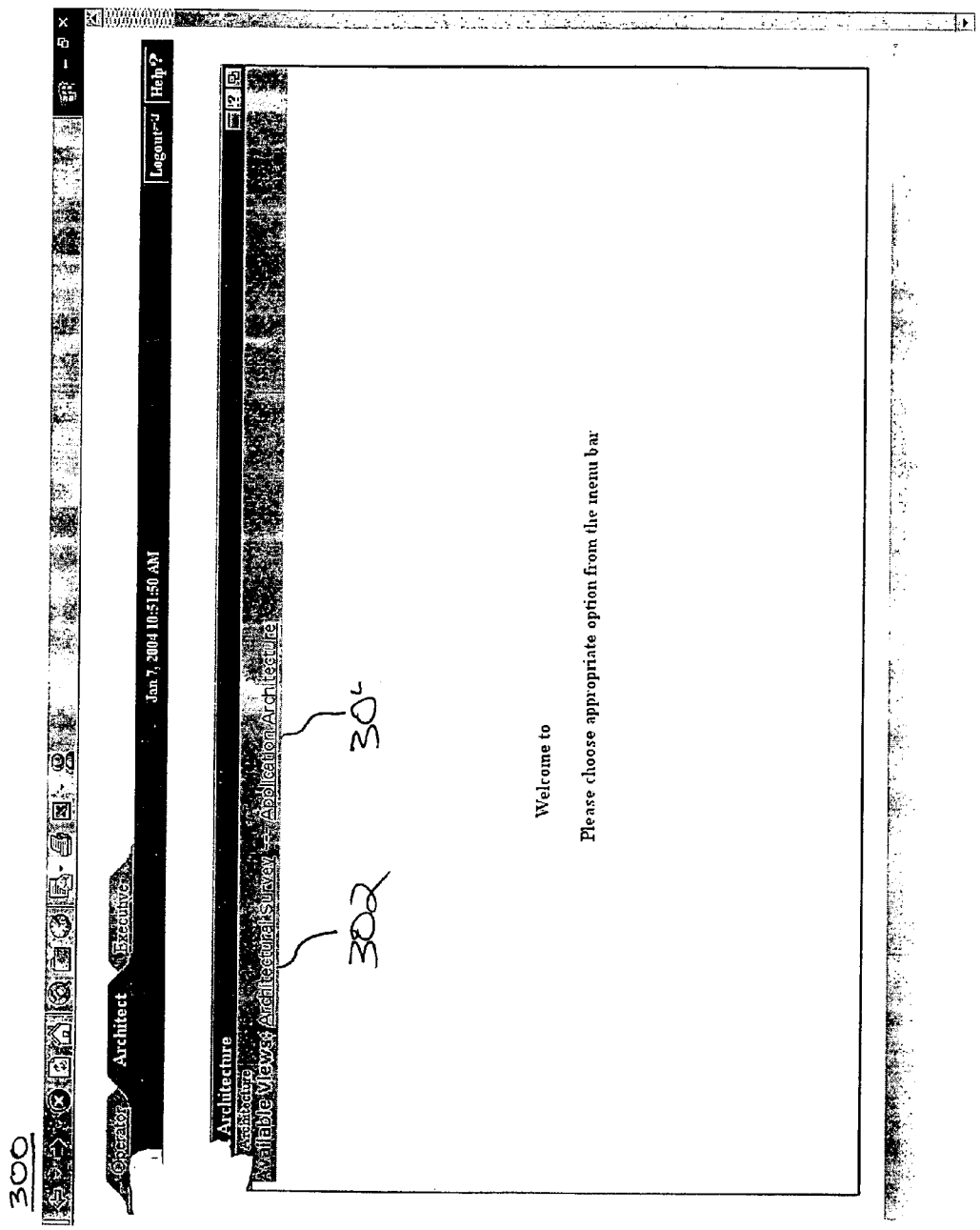
FIG. 7 depicts an architect view top-level graphical user interface screen for using the business activity monitoring system.

Turning now to FIG. 7, the architect view top-level GUI screen 300 is depicted and provides an Architectural Survey selector 302 and an Application Architecture selector 304. Selecting the Architectural Survey selector 302 will direct the user to an application survey page where the user is prompted to answer questions the answers to which will be employed by BAM 20 to score the efficiency and reliability of the architecture and allow for comparison with other architectural deployments. This capability may assist identifying architectures that would require greater effort to improve efficiency and operation. Selecting the Application Architecture selector 304 causes an Application Architecture GUI screen 350 to display.

Figure 8:
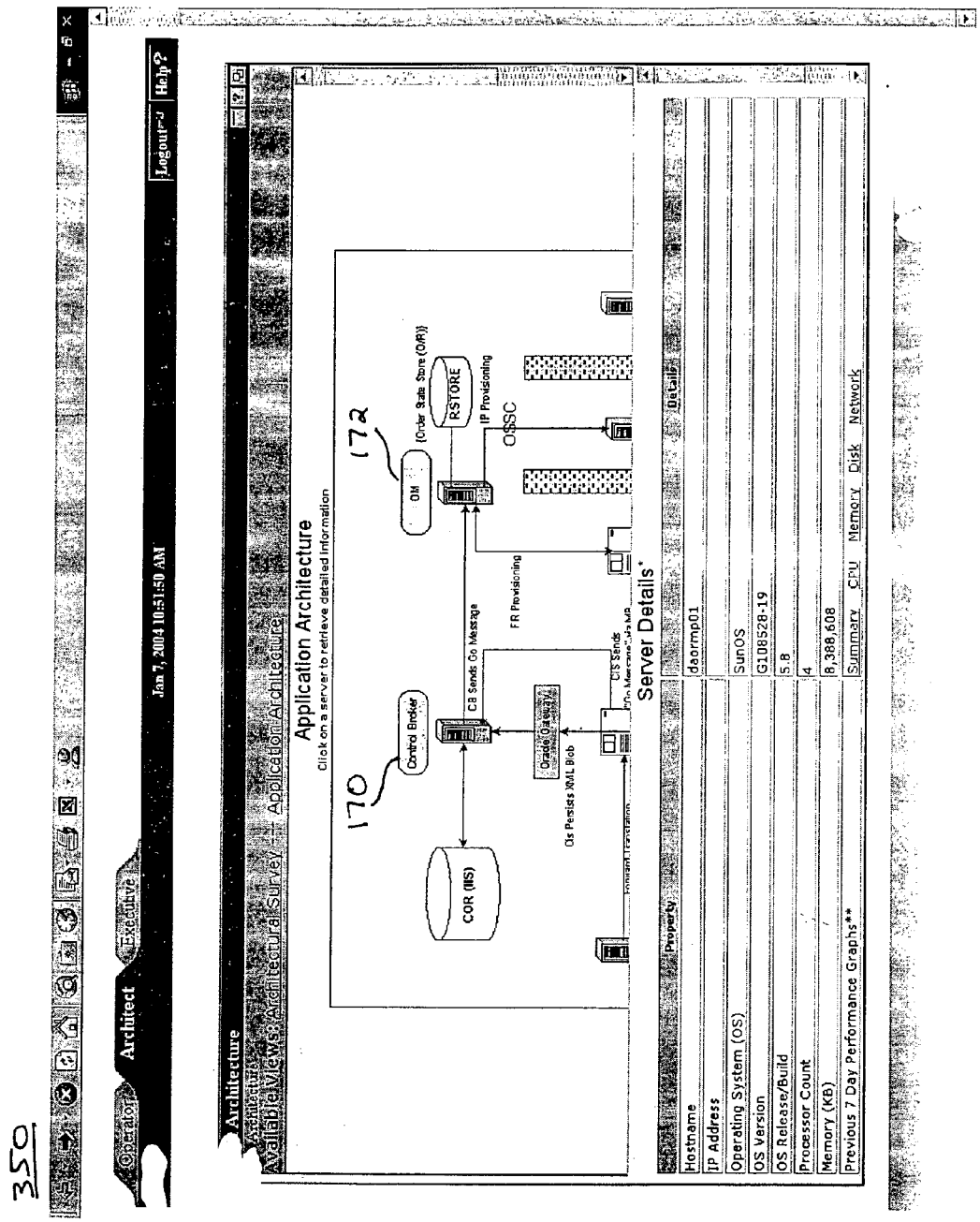
FIG. 8 depicts an application architecture graphical user interface screen for using the business activity monitoring system.

Turning now to FIG. 8, the Application Architecture GUI screen 350 is depicted and displays a visual map of the business process environment showing hardware deployment of the applications which collectively provide the business process. In FIG. 8 applications 170 and 172 are depicted. By clicking on a hardware component, hardware details associated with the hardware component are provided as are links to server level operational metrics over a seven day period. The hardware details may include hostname, IP address, operating system name, operating system version, operating system release and build, processor count (how many processors are housed in the selected hardware device), and memory size. Hardware metrics over a thirty five day period may be supported in some embodiments.

Figure 9:
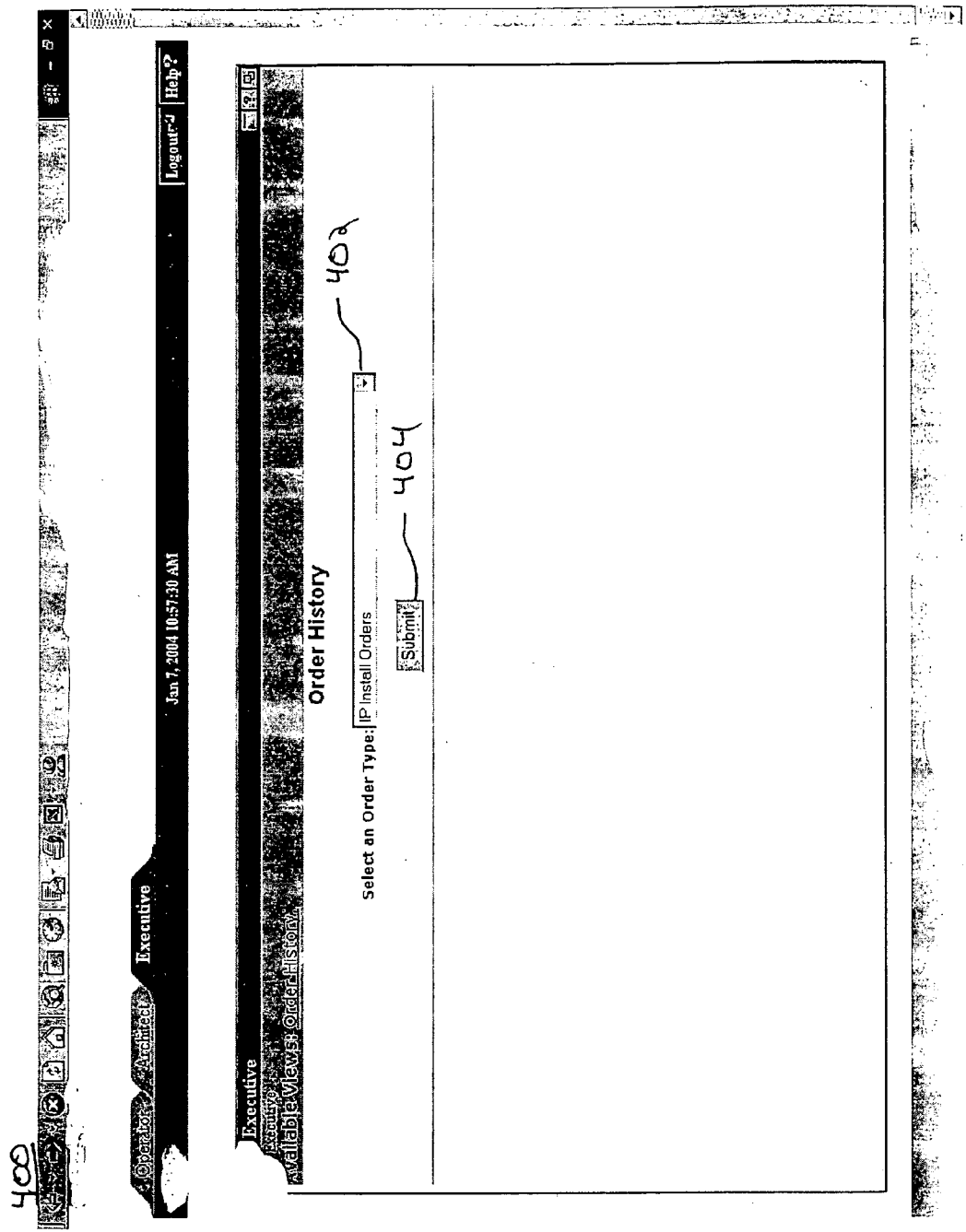
FIG. 9 depicts an executive view top-level graphical user interface screen for using the business activity monitoring system.

Turning now to FIG. 9, the Executive View top-level GUI screen 400 is depicted and includes an order history selection box 402 which provides a list of selectable order types and a submit button 404. When an order type is selected in the order history selection box 402 and the submit button 404 is activated, an Order History Graph GUI screen 450 is displayed.

Figure 10:
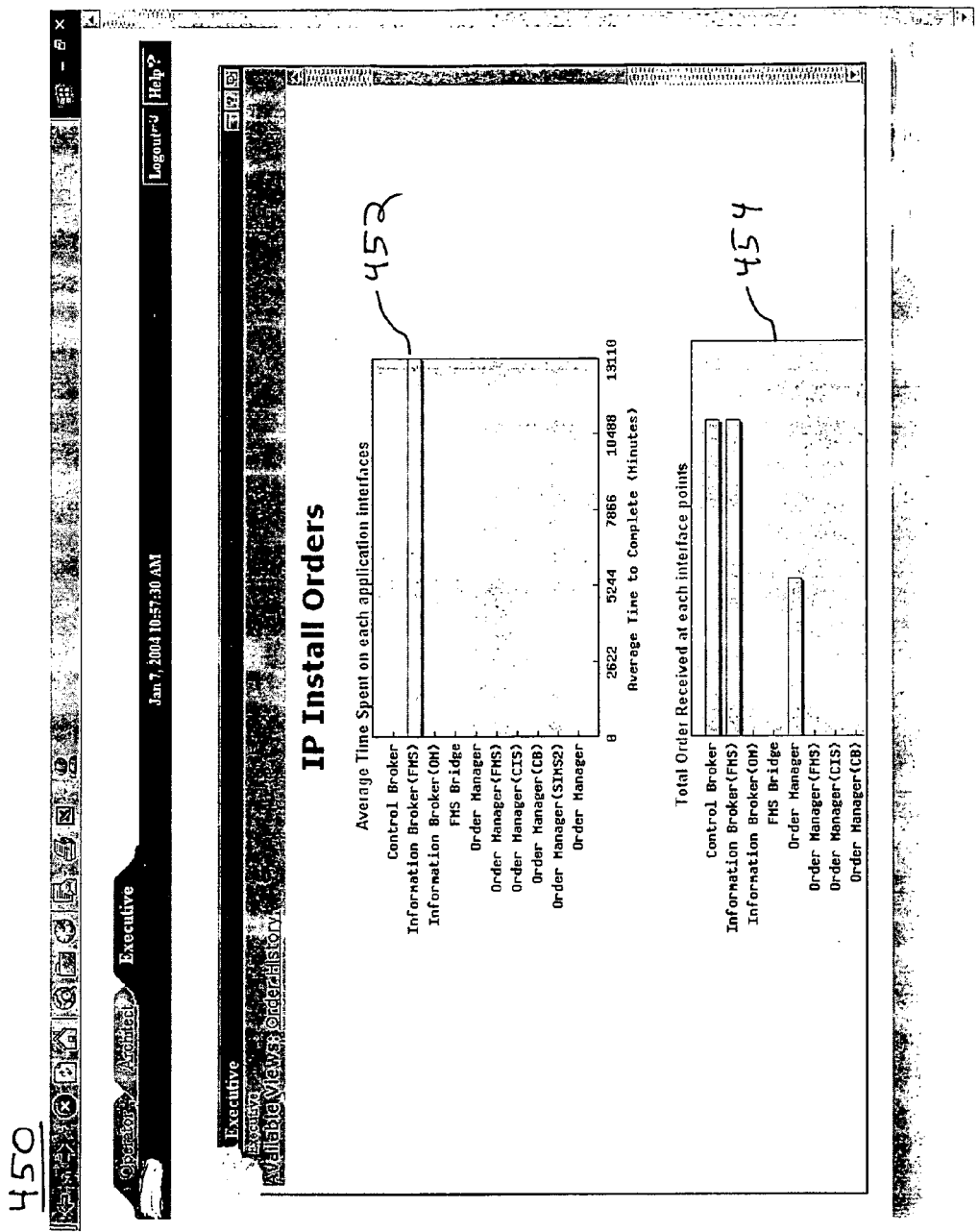
FIG. 10 depicts a first view of an order history graph graphical user interface screen for using the business activity monitoring system.

Turning now to FIG. 10, the Order History Graph GUI screen 450 is depicted and provides three graphs which depict average time spent on each application interface 452, total orders received at each interface point 454, and the install order trend 456 which depicts the volume of install orders over time. The Order History Graph GUI screen 450 provides a high level overview for the selected order of application performance, application volume, and order type trends.

Figure 11:
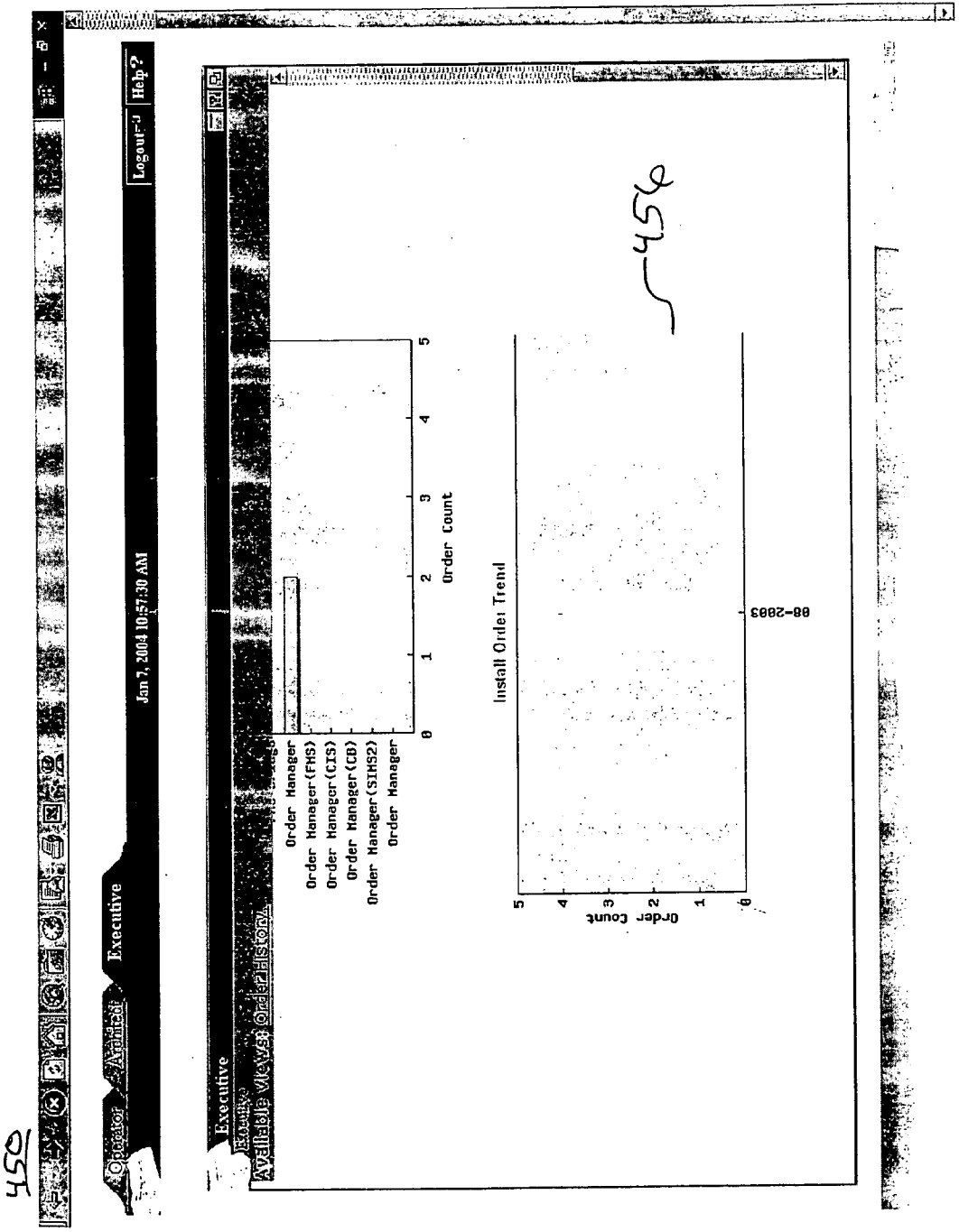
FIG. 11 depicts a second view of the order history graph graphical user interface screen.

Turning now to FIG. 11, a second view of the Order History Graph GUI screen 450 is depicted with the scroll bar operated to bring the install order trend 456 graph into view.

Figure 12:
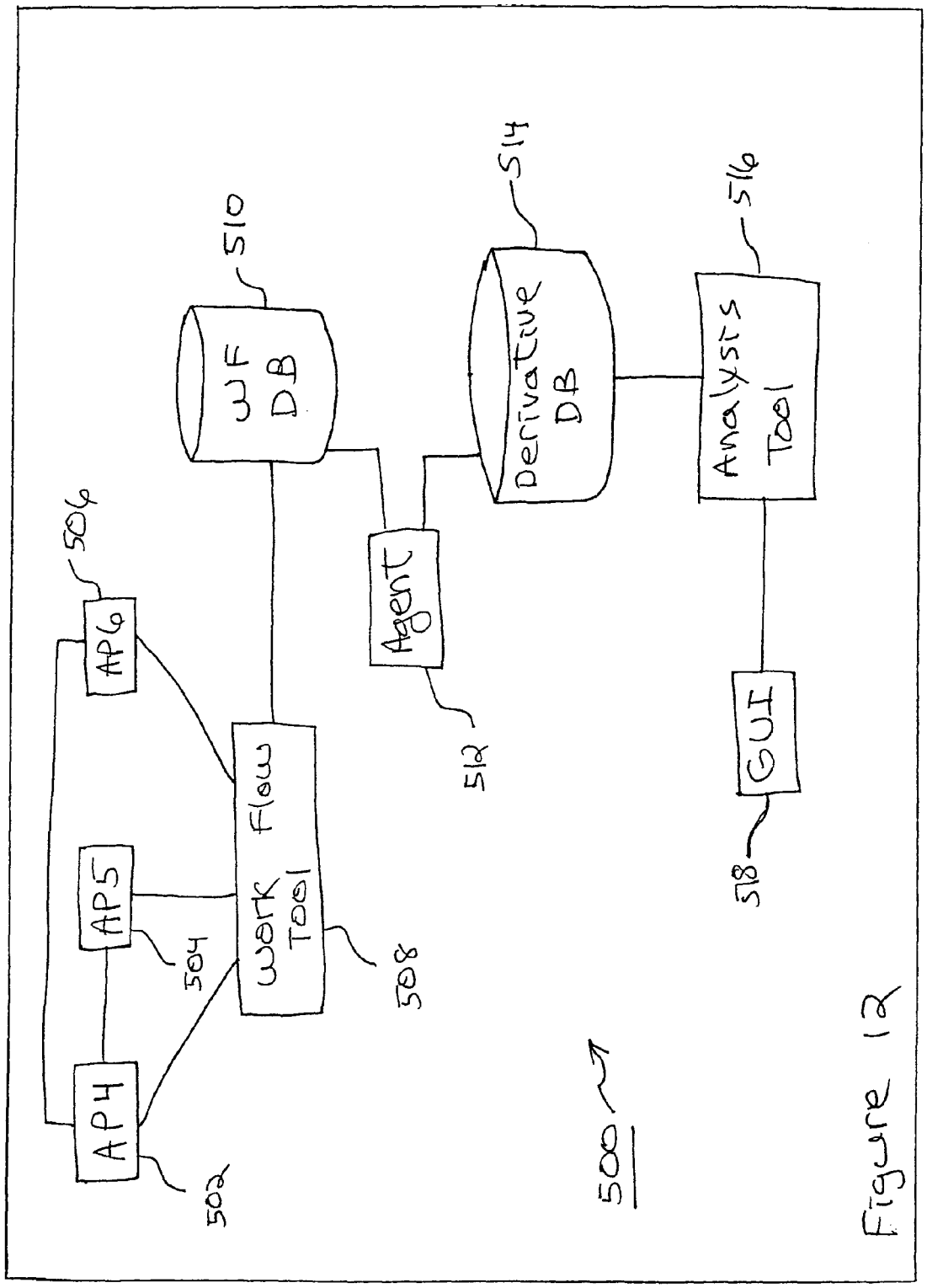
FIG. 12 depicts another embodiment of a business activity monitoring system.

Turning now to FIG. 12, another embodiment of a BAM system 500 is depicted. Applications 502, 504, and 506 are in communication with each other and with a work flow tool 508. In some embodiments the applications 502, 504, and 506 may not communicate directly with each other, and the actions of the applications 502, 504, and 506 handling an order entry may be sequenced by their communications with the work flow tool 508. The work flow tool 508 acts as a central clearinghouse to coordinate messages between the applications 502, 504, and 506. In some embodiments the work flow tool is the Vitria BusinessWare tool. The work flow tool 508 generates state objects which represent stages, or milestones, in the end-to-end business process and stores these state objects in a work flow database 510. When the Vitria BusinessWare tool is employed, the database 510 is an Oracle database called the "R-database" and the state objects may be known as business process objects (BPOs). The applications 502, 504, and 506 cooperate with each other and with the work flow tool 508 in providing the business process.

A software agent 512 creates derivative state objects, associated with the state objects stored in the workflow database, which it stores in a derivative database 514. In some embodiments the derivative state objects in the derivative database 514 may be created by database code in one of the databases 510 or 514, such as database triggers. An analysis tool 516 is in communication with the derivative database 514 and analyzes the derivate state objects to support order tracking and order reporting. The analysis tool 516 supports a web based interface depicted as a GUI 518 that provides a means for selecting different views of the business performance information gathered by the analysis tool 516.

The derivative database 514 serves two purposes. First, if the work flow tool is changed out for a different vendor's work flow tool, the analysis tool 516 and the GUI 518 need not change, so long as the derivative state objects continue to be generated and stored in the derivative database 514. Second, the vendor may discourage the use of their database 510 by other applications, such as the analysis tool 516. For more information on this architecture refer to U.S. patent application Ser. No. 10/272,423, filed Oct. 16, 2002, entitled "Order tracking and reporting tool," invented by Sunitha Shivananda, et al, which is incorporated herein by reference for all purposes.

Figure 13:
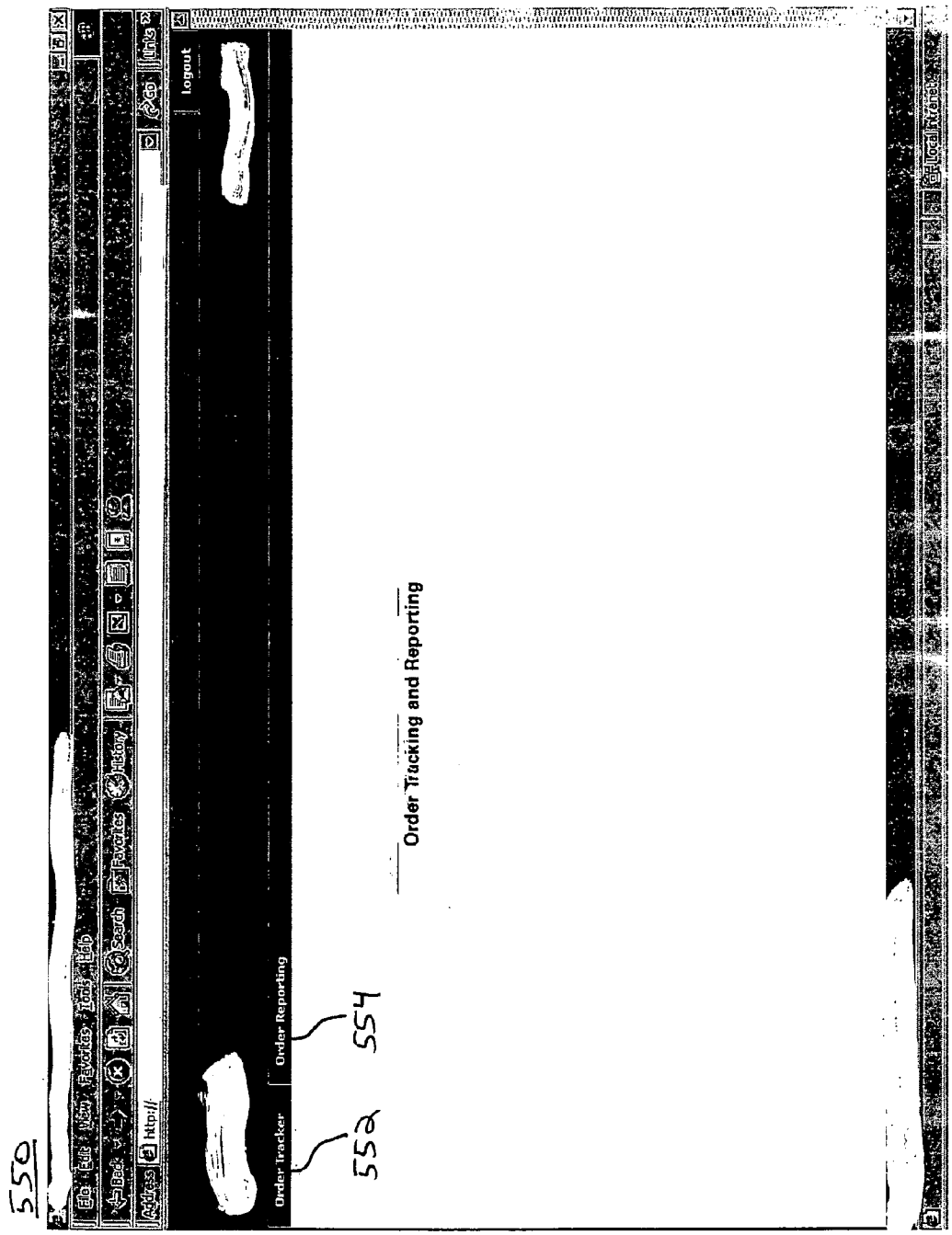
FIG. 13 depicts a top-level graphical user interface screen for using the business activity monitoring system.

Turning now to FIG. 13, a GUI entrance screen 550 for accessing the BAM system 500 is depicted. An order tracker selector button 552 and an order reporting selector button 554 at the top of the GUI entrance screen 500 permit selecting of the two main BAM system 500 features. Selecting the order tracker selector button 552 causes a search for order GUI screen 560 to appear. Selecting the order reporting selector button 554 causes an order reporting GUI screen 720 to appear.

Figure 14:
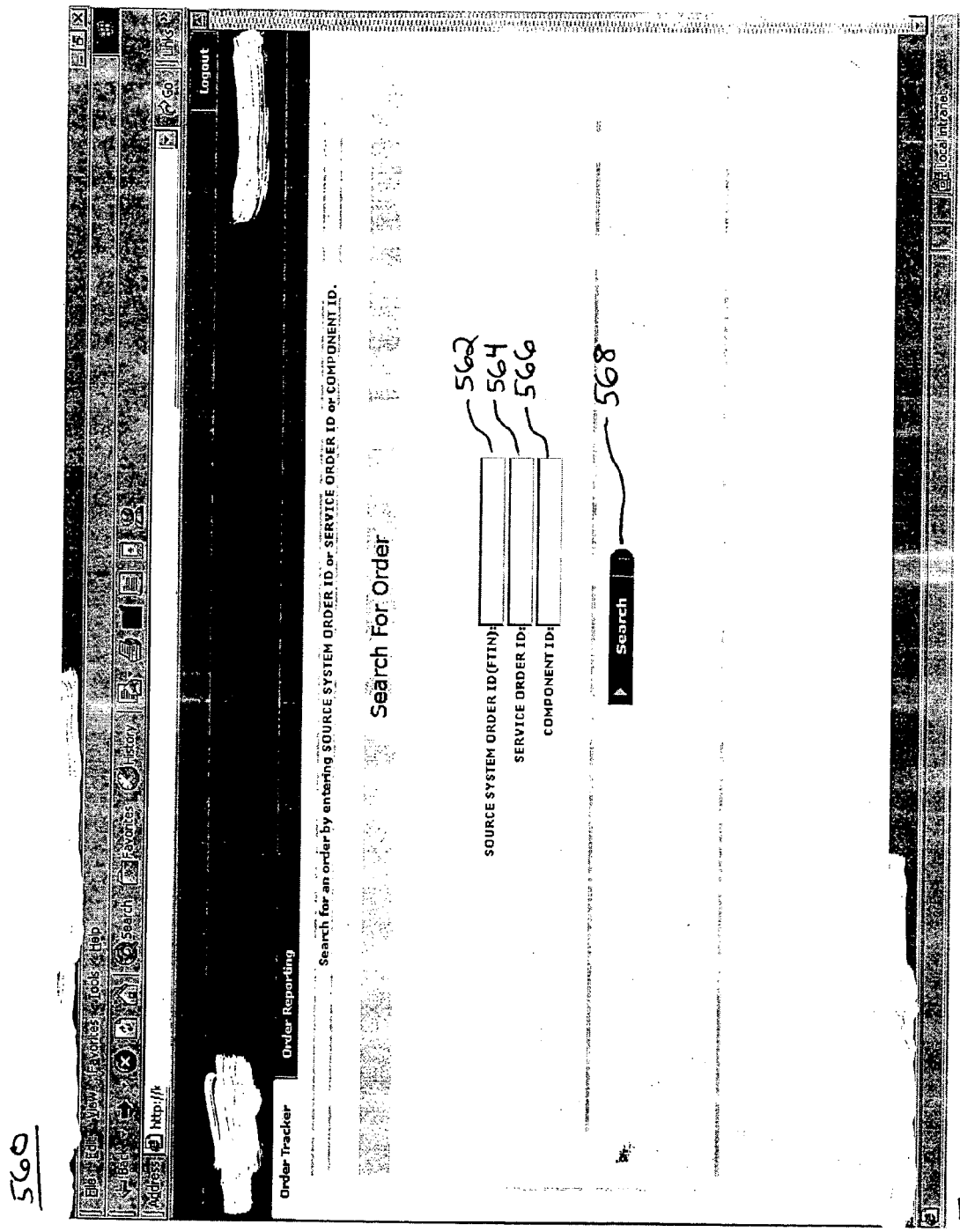
FIG. 14 depicts an order search graphical user interface screen for using the business activity monitoring system.

Turning now to FIG. 14, the search for order GUI screen 560 is depicted. The search for order GUI screen 560 is used to search for an order about which the user wishes to collect status and information. Information may be entered in a source system order ID box 562, a service order ID box 564, or a component ID box 566 and selection of a search button 568 initiates the search. Search results are displayed in a search results GUI screen 580.

Figure 15:
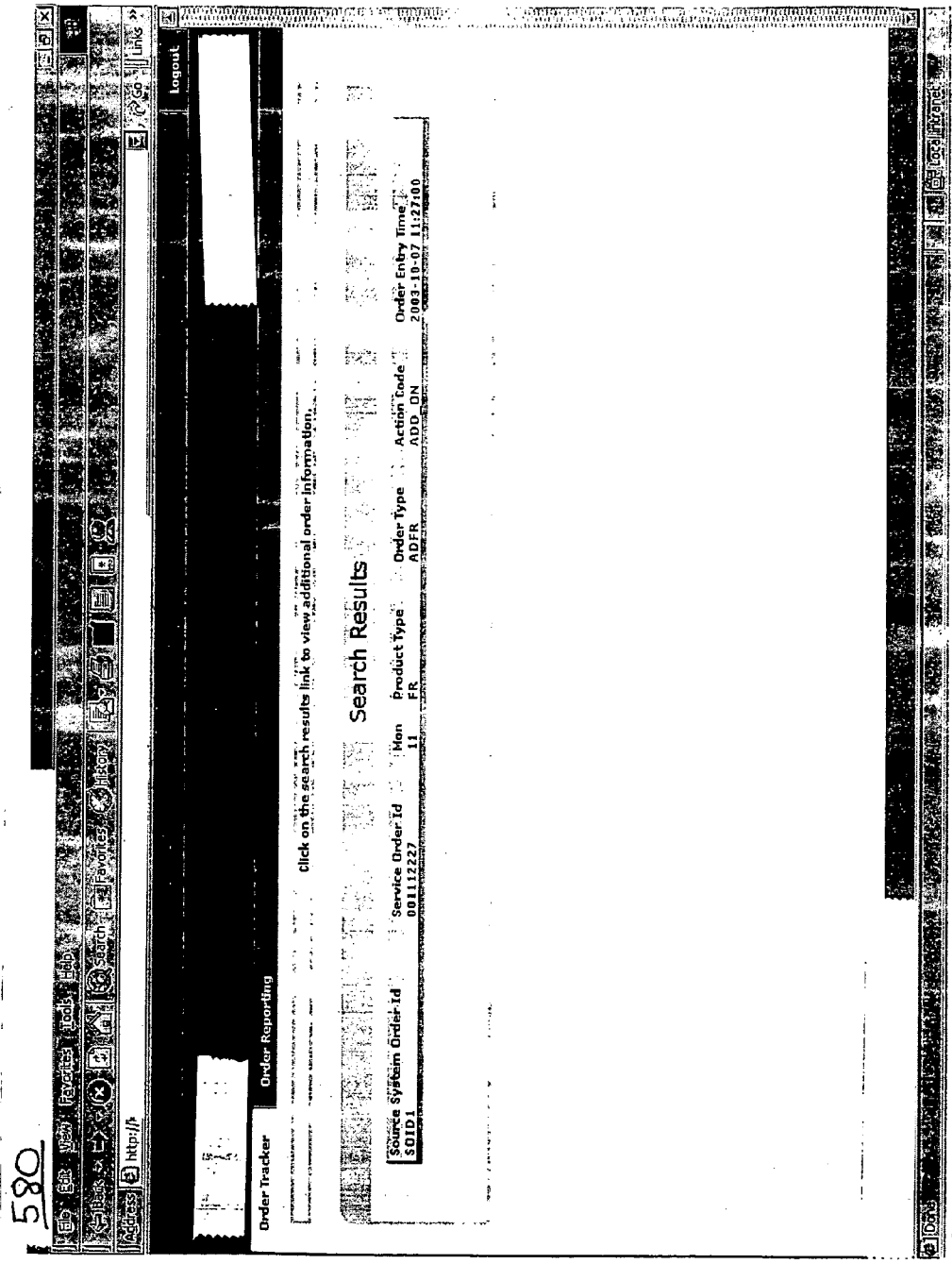
FIG. 15 depicts a search results graphical user interface screen for using the business activity monitoring system.

Turning now to FIG. 15, the search results GUI screen 580 is depicted. One or more orders are displayed in the search results GUI screen 580. The displayed information includes source system order ID, service order ID, MON, product type, order type, action code, and order entry date and time. Double clicking on an order in the search results GUI screen 580 causes an order detail GUI screen 590 to display.

Figure 16:
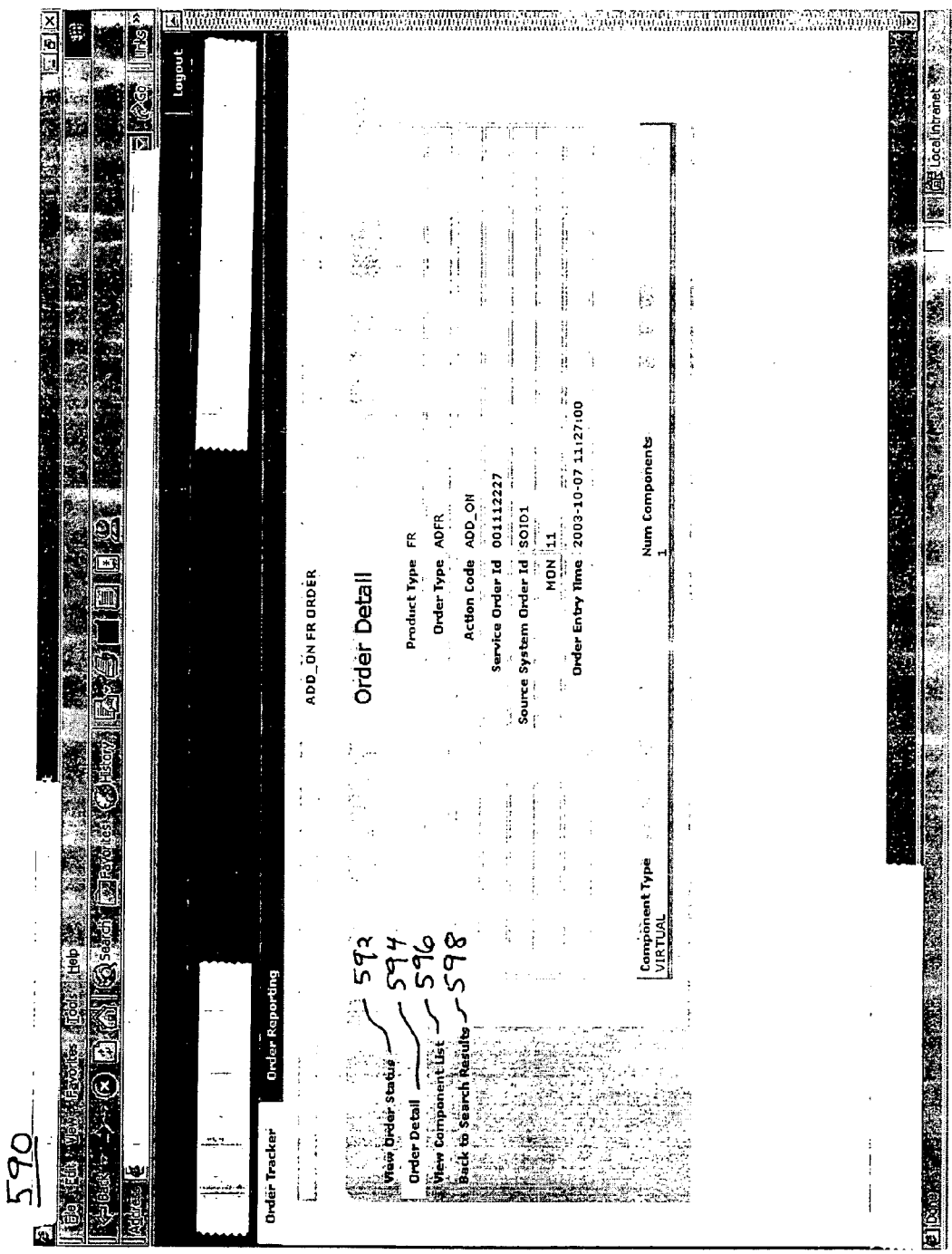
FIG. 16 depicts an order detail graphical user interface screen for using the business activity monitoring system.

Turning now to FIG. 16, the order detail GUI screen 590 is depicted. The order detail GUI screen 590 provides information on the product type, order type, action code, service order ID, source system order ID, MON, order entry time, and a catalog of components. On the left of the order detail GUI screen 590 a view order status selector tab 592 which selects an order status GUI screen 670 for display, an order detail selector tab 594 which selects the order detail GUI screen 590 for display, a view component list selector tab 596 which selects a component list GUI screen 620 for display, and a back to search results selector tab 598 which selects the search results GUI screen 580 are provided.

Figure 17:
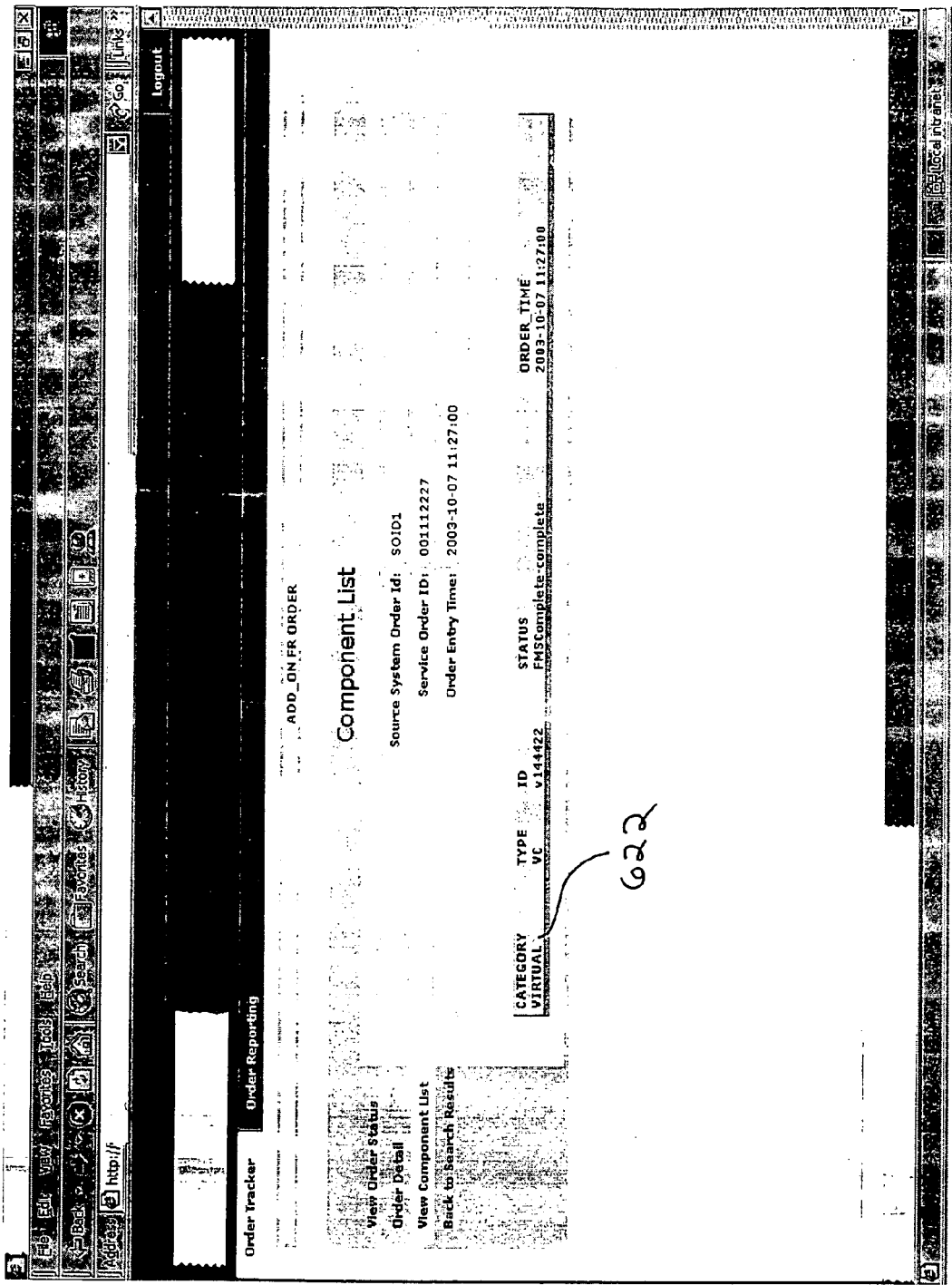
FIG. 17 depicts a component list graphical user interface screen for using the business activity monitoring system.

Turning now to FIG. 17, the component list GUI screen 620 is depicted to contain source system order ID, service order ID, order entry time, and one or more component links 622. The component link 622 contains information including category, type, ID, status, and order time. Clicking on the component link 622 causes a component status GUI screen 630 to display which provides a visual representation of where the component is in the work flow.

Figure 18:
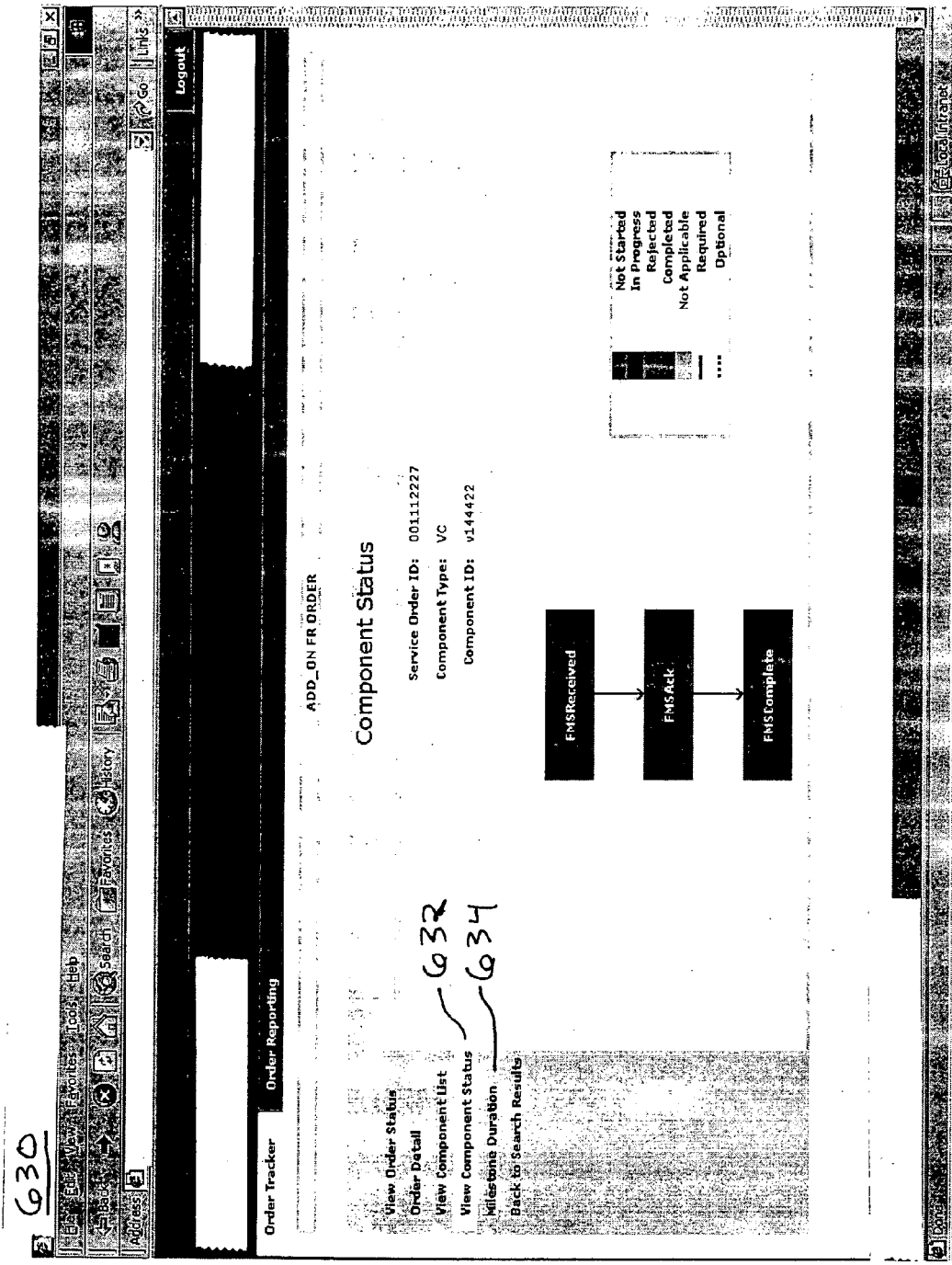
FIG. 18 depicts a component status graphical user interface screen for using the business activity monitoring system.

Turning now to FIG. 18, the component status GUI screen 630 is depicted to contain service order ID, component type, component ID, and a graphical representation of the milestones or states the order component must pass through to complete. The graphical representation, or graphical indicia, depicts alternate paths between states, indicating optional paths with a dotted line and indicating mandatory paths with a solid line. The states include not started, in progress, completed, rejected, and not applicable. The state of each milestone is depicted using color coding including a fourth color code, a fifth color code, a sixth color code, a seventh color code, and an eighth color code. The component status GUI screen 630 includes a view component status selector tab 632 which causes the component status GUI screen 630 to display and a milestone duration selector tab 634 which causes a component milestone duration GUI screen 650 to display which indicates how long it took for the component to complete each of the milestones.

Figure 19:
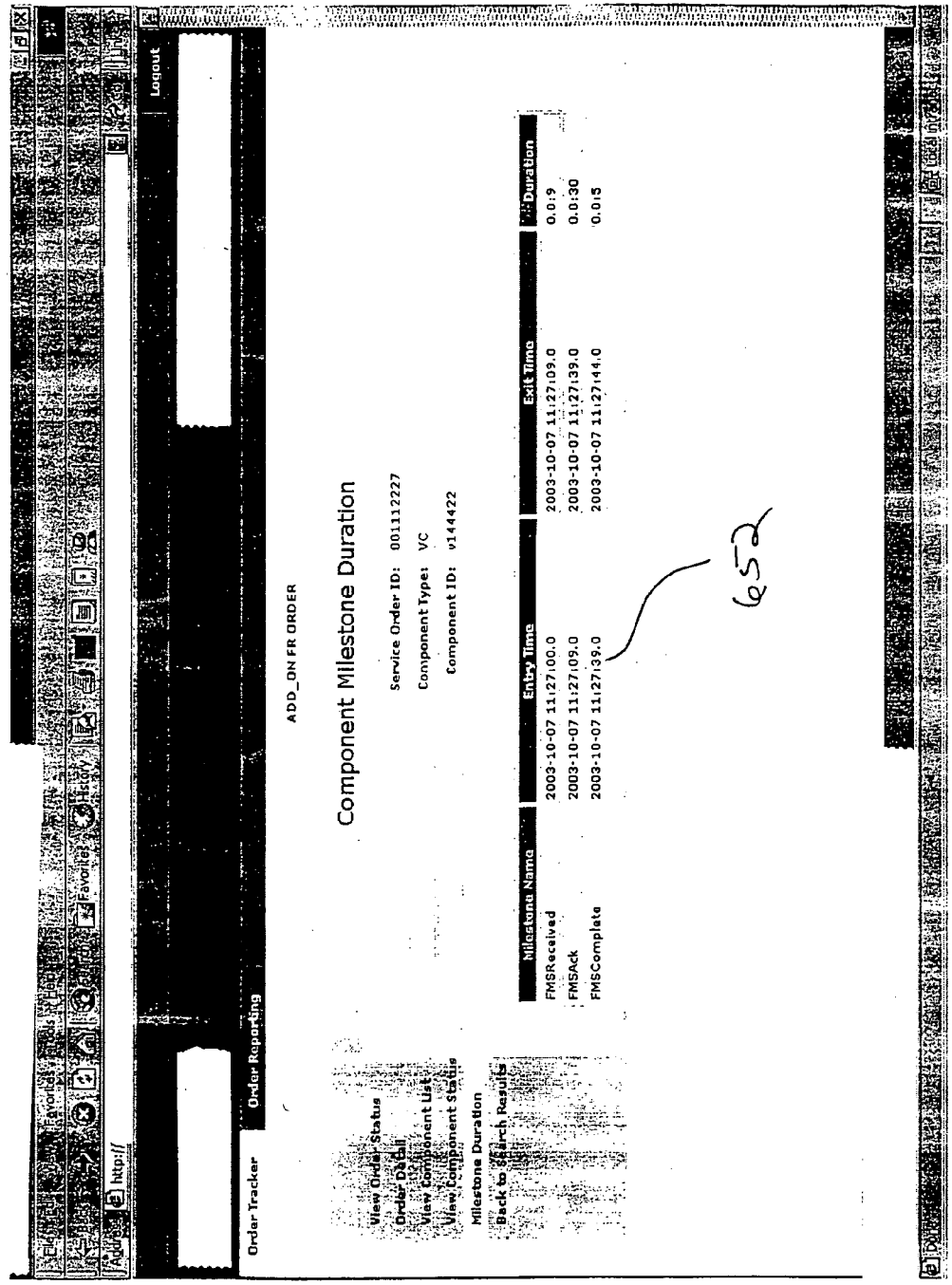
FIG. 19 depicts a component milestone duration graphical user interface screen for using the business activity monitoring system.

Turning now to FIG. 19, the component milestone duration GUI screen 650 is depicted to contain service order ID, component type, component ID, and a list of milestones 652. Each listed milestone includes the milestone name, the entry time of the milestone, the exit time of the milestone, and the duration of the processing of the milestone.

Figure 20:
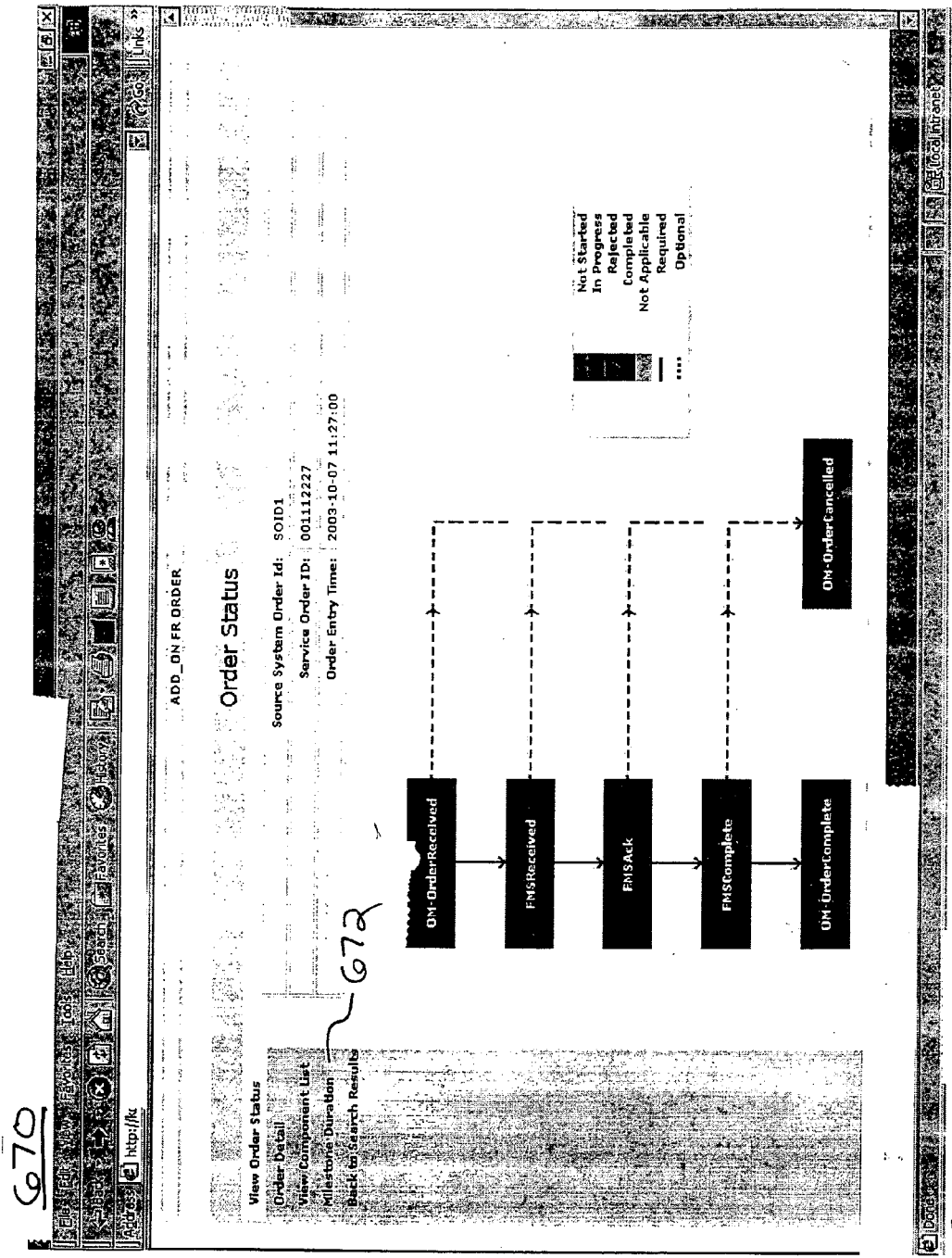
FIG. 20 depicts an order status graphical user interface screen for using the business activity monitoring system.

Turning now to FIG. 20, the order status GUI screen 670 is depicted to contain source system order ID, service order ID, order entry time, and a graphical representation of the milestones or states the order component must pass through to complete. The order status GUI screen 670 provides a visual representation of where the order currently resides in the work flow. The graphical representation depicts alternate paths between states, indicating optional paths with a dotted line and indicating mandatory paths with a solid line. The states include not started, in progress, completed, rejected, and not applicable which. The state of each milestone is depicted using color coding including a fourth color code, a fifth color code, a sixth color code, a seventh color code, and an eighth color code. This graphical representation and the milestone color coding are in agreement with those of the component status GUI screen 630. Clicking on the milestone duration selector tab 672 selects the order milestone duration GUI screen 680 for display.

One can imagine an operator, when handling a customer call, using this tool to find what the hold-up is in fulfilling the customer's order. The operator might bring up the order status GUI screen 670, visually traverse the order milestones while confirming "Green, green, red, ah ha! The order has been stuck in process Y for 114 days!" This functionality can save much time and will result in more customer understanding than the former process which may have required digging through unrelated and disparate information for several hours.

Figure 21:
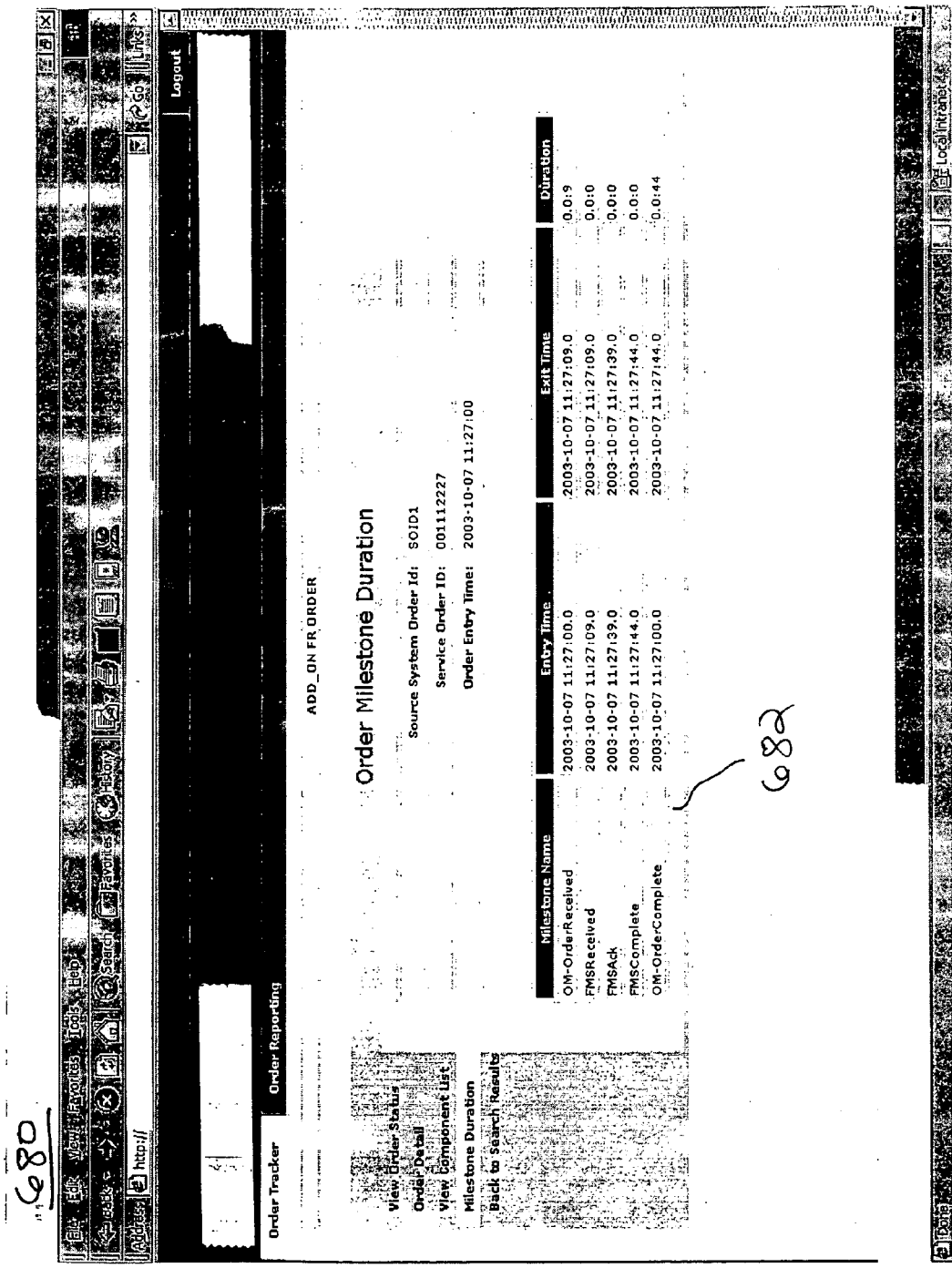
FIG. 21 depicts an order milestone duration graphical user interface screen for using the business activity monitoring system.

Turning now to FIG. 21, the order milestone duration GUI screen 680 is depicted to contain system order ID, service order ID, order entry time, and a list of milestone entries 682 for milestones which the order has entered. Each milestone entry includes the milestone name, entry time, exit time, and milestone duration.

Figure 22:
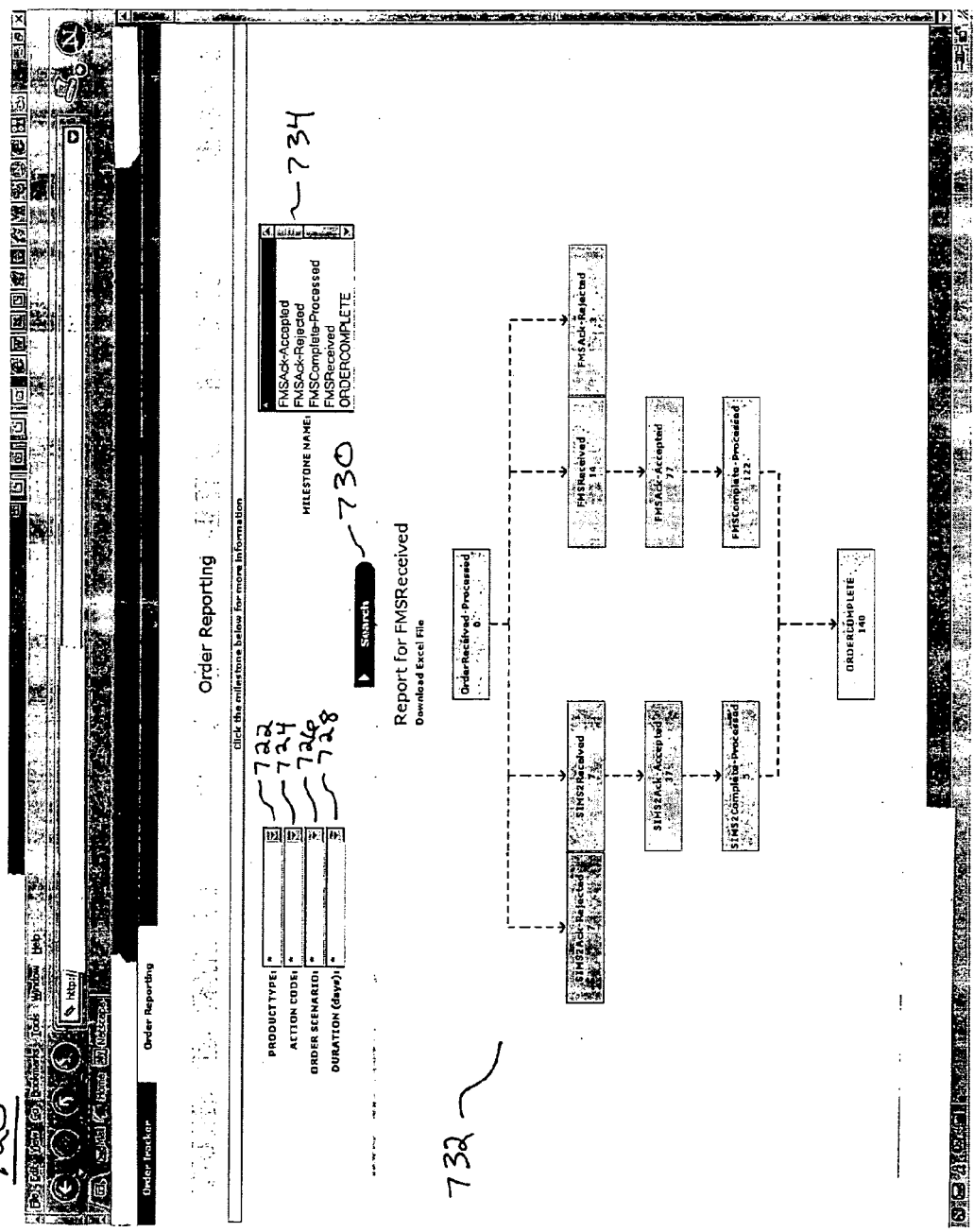
FIG. 22 depicts an order reporting graphical user interface screen for using the business activity monitoring system.

Turning now to FIG. 22, the order reporting GUI screen 720 is depicted. The order reporting GUI screen 720 provides several ways to search for reports. A product type drop-down box 722, an action code drop-down box 724, an order scenario drop-down box 726, and a duration drop-down box 728 are provided which may be used to select search criteria information. Selecting a search button 730 causes a search for order reports corresponding to the search criteria defined in drop-down boxes 722, 724, 726, and 728. A model of the order flow 732 displays which contains the milestones of the workflow. Each milestone box in the model of the order flow 732 provides the number of orders residing in the milestone model representation. Clicking on a milestone name located in a milestone name table 734 or in the model of the order flow 732 causes an order list GUI screen 760 to display.

Turning now to FIG. 23, the order list GUI screen 760 is depicted. This page presents orders, in order list table 762, residing in the milestone identified in the report title 764. Each entry in the order list table 762 includes information on product type, order type, action code, service order ID, source system order ID, milestone name, order entry time, and duration the order has been in the milestone. Clicking on an order entry causes the order detail GUI screen 590 to display for the selected order. A download report button 766 will cause the order list table 762 to be downloaded to an Excel document.

The BAM system 10 and the BAM system 500 are not mutually exclusive embodiments. Both the BAM system 10 and the BAM system 500 may be deployed in the same enterprise and may provide complementary BAM information. The BAM system 500 may only be employed with work flow enabled applications. In some embodiments the BAM system 500 may provide a more detailed view of order processing. The BAM system 10 may be employed for any set of applications.

The BAM systems 10 and 500 provide a rich set of monitoring features whose collective thrust is to reveal the business process as a whole. Limited tools may have the effect of confining the view and thinking of enterprise operators. Tools which focus on the health of individual boxes may lure enterprise operators into the mistaken conclusion that if the computing systems are running the business process is running. The BAM systems 10 and 500, by focusing on the end-to-end business process and by providing a rich set of features, avoid lolling enterprise operators into this delusion. The BAM system 10 provides extra convenience and utility by providing views tuned to the concerns of different user communities.

The system described above may be implemented on any general-purpose computer with sufficient processing power, memory resources, and network throughput capability to handle the necessary workload placed upon it. FIG. 24 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) 990 devices, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O 990 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, token ring cards, fiber distributed data interface (FDDI) cards, and other well-known network devices. These network connectivity 992 devices may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A business activity monitoring system for monitoring events processed by event processing applications implemented on different legacy computer systems to enable identification of one or more problems associated with an order processing system, the business activity monitoring comprising:
    an order processing system comprising:
        a first legacy computer system, the first legacy computer system comprising:
            at least one processor;
            a first application stored in a memory and executable by the first legacy computer system to process a first portion of an order and write first application data to a first application log file, wherein the first application data is related to the processing of the first portion of the order by the first application; and
            a first log agent stored in a memory and executable by the first legacy computer system to monitor a first resource data related to the first legacy computer system used by the first application to process at least some of the first portion of the order and write the first resource data to a first resource log file; and
        a second legacy computer system having a different architecture than the first legacy computer system, the second legacy computer system comprising: at least one processor;
            a second application stored in a second memory and executable by the second legacy computer system to process a second portion of the order and write second application data to a second application log file, wherein the second application data is related to the processing of the second portion of the order by the second application, and wherein the second application is distinct from the first application; and
            a second log agent stored in a memory and executable by the second legacy computer system to monitor a second resource data related to the second legacy computer system used by the second application to process at least some of the second portion of the order and write the second resource data to a second resource log file;
    a plurality of log adapters, each stored in a memory and executable by a processor to communicate with a corresponding one of the first application log file, the second application log file, the first resource log file, and the second resource log file to extract at least a portion of the corresponding one of the first application data, the second application data, the first resource data, and the second resource data instead of communicating with and extracting information from the first application and the second application;
    a third computer system independent of the first legacy computer system and the second legacy computer system, the third computer system comprising a monitor component stored in a memory and executable by a processor to communicate with the plurality of log adapters, and determine event status information related to the order using the at least the portion of the first application data, the at least the portion of the second application data, the at least the portion of the first resource data, and the at least the portion of the second resource data without interfering with the processing of the order, wherein the event status information identifies a status of the order within the order processing system and enables analysis of business activities associated with the order processing system, and wherein the analysis enables identification of one or more problems associated with the order processing system; and
    a graphical user interface stored in a memory and executable by a processor to graphically illustrate an architecture of at least one of the first legacy computer system and the legacy second computer system used by at least one of the first application and the second application to process portions of the order, select a hardware component of the illustrated architecture, and display hardware statistics of the selected hardware component.

2. The system of claim 1, wherein the monitor component is further executable to aggregate the at least the portion of the first application data and the at least the portion of the second application data to determine a current status of at least one of the first portion of the order and the second portion of the order.

3. The system of claim 1, wherein the monitor component is further executable to aggregate the at least the portion of the first resource data and the at least the portion of the second resource data and provide a computer architecture information.

4. The system of claim 1, wherein the monitor component is further executable to aggregate the at least the portion of the first resource data and the at least the portion of the second resource data and provide a computer capacity information.

5. The system of claim 1, wherein the monitor component is further executable to determine event status information during processing of at least one of the first portion of the order and the second portion of the order by at least one of the first application and the second application.

6. The system of claim 1, wherein at least one of the first application data and the second application data includes a name associated with an application processing the order and at least one time stamp associated with when the application processes portions of at least one of the first portion of the order and the second portion of the order.

7. The system of claim 1, wherein at least one of the first resource data and the second resource data includes hardware statistics related to at least one of the first legacy computer system and the second legacy computer system.

8. The system of claim 7, wherein the hardware statistics are further defined as a memory parameter of at least one the first legacy computer system and the second legacy computer system.

9. The system of claim 8, wherein at least one of the first legacy computer system and the second legacy computer system allocate all memory on startup to cache memory and wherein the memory parameter is further defined as a memory page allocation by at least one of the first legacy computer system and the second legacy computer system, wherein the monitor component uses the memory page allocation to determine the memory usage by at least one of the first legacy computer system and the second legacy computer system.

10. A business activity monitoring method for monitoring order processing by an order processing system including applications operating on computer systems to enable identification of one or more problems associated with the order processing system, the business activity monitoring method comprising:
processing, by a first application stored in a first memory and executed by a first legacy computer system of the order processing system, at least a portion of an order;
writing, by the first application, first application data related to the first application processing the order to a first application log file;
writing, by a first log agent stored in a memory and executed by the first legacy computer system, first hardware information related to the first legacy computer system whereon the first application processes the order to a first resource log file;
processing, by a second application stored in a memory and executed by a second legacy computer system of the order processing system, at least a portion of the order, wherein the second legacy computer system has a different architecture than the first legacy computer system, and wherein the second application is distinct from the first application;
writing, by the second application, second application data related to the second application processing the order to a second application log file;
writing, by a second log agent stored in the second memory and executed by the second legacy computer system, second hardware information related to the second legacy computer system whereon the second application processes the order to a second resource log file;
extracting, by a plurality of corresponding log adapters stored in a memory and executed by a processor, at least a portion of the first application data, at least a portion of the second application data, at least a portion of the first hardware information, and at least a portion of the second hardware information from the first application log file, the second application log file, the first resource log file, and the second resource log file instead of extracting information from the first application and the second application;
aggregating, by a monitor component stored in a memory and executed by a third computer system that is independent of the first legacy computer system and the second legacy computer system, the at least the portion of the first application data, the at least the portion of the second application data, the at least the portion of the first hardware information, and the at least the portion of the second hardware information to monitor order processing without interfering with the processing of the order and to enable identification of one or more problems associated with the order processing system;
graphically illustrating, by a first graphical user interface stored in a memory and executed by a processor, an architecture of at least one of the first legacy computer system and the legacy second computer system used by at least one of the first application and the second application to process portions of the order;
selecting, by the first graphical user interface, a hardware component of the illustrated architecture;
displaying, by the first graphical user interface, hardware statistics of the selected hardware component; and
displaying, by a second graphical user interface stored in a memory and executed by a processor, each application processing the order and a processing time spent by each application on processing the order.

11. The method of claim 10, further comprising using, by the monitor component, at least one of the at least the portion of the first application data and the at least the portion of the second application data to determine a status of the order.

12. The method of claim 11, wherein the status of the order includes a percentage complete of processing of the order.

13. The method of claim 11, wherein the status of the order includes identifying a particular application currently processing the order.

14. The method of claim 13, wherein the status of the order includes a processing time of the order by the particular application.

15. The method of claim 10, further comprising providing a third graphical user interface identifying each application processing the order, the third graphical user interface further identifying a total number of orders received by each application.

16. The method of claim 10, further comprising:
providing a third graphical user interface to monitor orders.

17. The method of claim 16, further comprising:
selecting, by the third graphical user interface, at least one order to monitor;
searching, by the monitor component, the at least the portion of the first application data and the at least the portion of the second application data for the at least one order selected; and
providing, by the third graphical user interface, an order report identifying a current status of the at least one order.

18. The computer implemented method of claim 17, further comprising:
establishing, by the third graphical user interface, an alarm threshold for an application related to processing of the at least one order;
notifying, by the third graphical user interface, when the alarm threshold has been exceeded.

19. The method of claim 17, further comprising:
    establishing, by the third graphical user interface, an alarm threshold for the at least one order;
    notifying, by the third graphical user interface, when the alarm threshold has been exceeded.

20. The computer implemented method of claim 19, further comprising notifying, via a pager, when the alarm threshold has been exceeded.

21. A business activity monitoring method for monitoring order processing by an order processing system including applications operating on computer systems to enable identification of one or more problems associated with the order processing system, the business activity monitoring method comprising:
    processing, by a first application stored in a first memory and executed by a first legacy computer system of the order processing system, at least a portion of an order;
    writing, by the first application, application data related to the first application processing the order to a first application log file;
    writing, by a first log agent stored in a memory and executed by the first computer system, first hardware information related to the first computer system whereon the first application processes the order to a first resource log file;
    processing, by a second application stored in a first memory and executed by a second legacy computer system of the order processing system, at least a portion of the order, wherein the second legacy computer system has a different architecture than the first legacy computer system, and wherein the second application is distinct from the first application;
    writing, by the second application, application data related to the second application processing the order to a second application log file;
    writing, by a second log agent stored in a memory and executed by the second legacy computer system, second hardware information related to the second legacy computer system whereon the second application processes the order to a second resource log file;
    extracting, by a plurality of log adapters stored in a memory and executed by a processor, at least a portion of the first application data, at least a portion of the second application data, at least a portion of the first hardware information, and at least a portion of the second hardware information from the first application log file, the second application log file, the first resource log file, and the second resource log file instead of extracting information from the first application and the second application;
    aggregating, by a monitor component stored in a memory and executed by a third computer system that is independent of the first legacy computer system and the second legacy computer system, the at least the portion of the first application data, the at least the portion of the second application data, the at least the portion of the first hardware information, and the at least a portion of the second hardware information to monitor order processing without interfering with the processing of the order and to enable identification of one or more problems associated with the order processing system;
    graphically illustrating, by a graphical user interface stored in a memory and executed by a processor, a hardware architecture of at least one of the first legacy computer system and the second legacy computer system used by at least one of the first application and the second application to process portions of the order;
    selecting, by the graphical user interface, a hardware component of the illustrated hardware architecture; and
    displaying, by the graphical user interface, hardware statistics of the selected hardware component.

22. The method of claim 21, wherein the hardware statistics are related to one of the first legacy computer system and the second legacy computer system.

23. The method of claim 21, wherein the hardware statistics are further defined as a memory parameter of one of the first legacy computer system and the second legacy computer system.

* * * * *